(12) United States Patent
Li et al.

(10) Patent No.: US 10,368,092 B2
(45) Date of Patent: Jul. 30, 2019

(54) ENCODER-SIDE DECISIONS FOR BLOCK FLIPPING AND SKIP MODE IN INTRA BLOCK COPY PREDICTION

(71) Applicant: Microsoft Technology Licensing, LLC, Redmond, WA (US)

(72) Inventors: Bin Li, Beijing (CN); Jizheng Xu, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/029,585

(22) PCT Filed: Mar. 4, 2014

(86) PCT No.: PCT/CN2014/072834
§ 371 (c)(1),
(2) Date: Apr. 14, 2016

(87) PCT Pub. No.: WO2015/131326
PCT Pub. Date: Sep. 11, 2015

(65) Prior Publication Data
US 2016/0277761 A1 Sep. 22, 2016

(51) Int. Cl.
*H04N 19/103* (2014.01)
*H04N 19/593* (2014.01)
(Continued)

(52) U.S. Cl.
CPC ......... *H04N 19/593* (2014.11); *H04N 19/105* (2014.11); *H04N 19/124* (2014.11);
(Continued)

(58) Field of Classification Search
CPC .... H04N 19/593; H04N 19/136; H04N 19/46; H04N 19/176; H04N 19/105;
(Continued)

(56) References Cited

U.S. PATENT DOCUMENTS 2,239,538 A 4/1941 Richter
2,718,173 A 9/1955 Hacman et al.
(Continued)

FOREIGN PATENT DOCUMENTS

CN 1857001 11/2006
CN 1874487 12/2006
(Continued)

OTHER PUBLICATIONS

David Flynn, "High Efficiency Video Coding (HEVC) Range Extensions text specification: Draft 6", JCTVC-P1005, Jan. 9-17, 2014 (Year: 2014).*
(Continued)

*Primary Examiner* — Sathyanaraya V Perungavoor
*Assistant Examiner* — Philip P. Dang
(74) *Attorney, Agent, or Firm* — Klarquist Sparkman, LLP

(57) ABSTRACT

Innovations in the area of encoding blocks using hash-based block matching improve coding efficiency in many situations. For example, some of the innovations relate to encoder-side decisions about when to use block flipping during prediction. Other innovations relate to encoder-side decisions about when to use skip mode for a block predicted using intra block copy ("BC") prediction.

15 Claims, 24 Drawing Sheets

(51) Int. Cl.
*H04N 19/105* (2014.01)
*H04N 19/176* (2014.01)
*H04N 19/126* (2014.01)
*H04N 19/61* (2014.01)
*H04N 19/124* (2014.01)
*H04N 19/132* (2014.01)

(52) U.S. Cl.
CPC ......... *H04N 19/126* (2014.11); *H04N 19/132* (2014.11); *H04N 19/176* (2014.11); *H04N 19/61* (2014.11)

(58) Field of Classification Search
CPC ...... H04N 19/70; H04N 19/97; H04N 1/4486; H04N 1/4466; H04N 19/44; H04N 19/124; H04N 19/132; H04N 19/126; H04N 19/61
See application file for complete search history.

(56) References Cited

U.S. PATENT DOCUMENTS

| | | | |
|---|---|---|---|
| 3,059,528 | A | 10/1962 | Allan |
| 3,142,236 | A | 7/1964 | Siegmund et al. |
| 3,642,351 | A | 2/1972 | Tronnier et al. |
| 4,918,583 | A | 4/1990 | Kudo et al. |
| 5,016,980 | A | 5/1991 | Waldron |
| 5,610,841 | A * | 3/1997 | Tanaka ................ H04L 49/255 348/E5.008 |
| 5,613,004 | A * | 3/1997 | Cooperman .......... G06T 1/0021 348/E7.056 |
| 5,687,236 | A * | 11/1997 | Moskowitz ........... G06T 1/0021 348/E7.056 |
| 5,689,365 | A | 11/1997 | Takahashi |
| 5,774,271 | A | 6/1998 | Lagerway et al. |
| 5,850,312 | A | 12/1998 | Kato et al. |
| 6,332,092 | B1 | 12/2001 | Deckert et al. |
| 6,487,440 | B2 | 11/2002 | Deckert et al. |
| 6,618,197 | B1 | 9/2003 | Hayakawa |
| 6,879,266 | B1 | 4/2005 | Dye et al. |
| 6,894,289 | B2 | 5/2005 | Nilson et al. |
| 6,904,110 | B2 | 6/2005 | Trans et al. |
| 6,915,387 | B1 | 7/2005 | Huffman et al. |
| 6,938,128 | B1 | 8/2005 | Kuskin et al. |
| 6,983,020 | B2 * | 1/2006 | Christiansen ........... G06T 9/004 375/240.16 |
| 6,995,918 | B2 | 2/2006 | Terasawa et al. |
| 7,046,460 | B2 | 5/2006 | Nozawa |
| 7,206,346 | B2 | 4/2007 | Shimizu et al. |
| 7,216,232 | B1 * | 5/2007 | Cox ...................... G06T 1/0021 713/176 |
| 7,239,454 | B2 | 7/2007 | Kobayashi et al. |
| 7,349,583 | B2 | 3/2008 | Kumar et al. |
| 7,379,499 | B2 | 5/2008 | Dahlhoff et al. |
| 7,400,774 | B2 * | 7/2008 | Puri ...................... H04N 19/46 375/E7.029 |
| 7,421,128 | B2 | 9/2008 | Venkatesan et al. |
| 7,430,670 | B1 * | 9/2008 | Horning ................. G06F 21/14 713/190 |
| 7,466,418 | B2 | 12/2008 | Nilson et al. |
| 7,606,974 | B2 | 10/2009 | Dai et al. |
| 7,609,763 | B2 * | 10/2009 | Mukerjee ............... H04N 19/56 375/240.16 |
| 7,613,364 | B2 | 11/2009 | Kang et al. |
| 7,636,824 | B1 | 12/2009 | Tormasov |
| 7,672,005 | B1 | 3/2010 | Hobbs et al. |
| 7,702,127 | B2 * | 4/2010 | Mihcak ................. G06T 1/0028 382/100 |
| 7,706,682 | B2 | 4/2010 | Keller et al. |
| 7,733,497 | B2 | 6/2010 | Yun et al. |
| 7,747,584 | B1 * | 6/2010 | Jernigan, IV ..... G06F 17/30156 707/692 |
| 7,761,712 | B2 * | 7/2010 | Moskowitz ........... G06T 1/0021 380/28 |
| 7,868,792 | B2 | 1/2011 | Artan et al. |
| 7,870,393 | B2 * | 1/2011 | Moskowitz ........... G06T 1/0021 380/205 |
| 7,873,786 | B1 | 1/2011 | Singh et al. |
| 7,912,244 | B2 * | 3/2011 | Mihcak ................. G06T 1/0028 382/100 |
| 7,949,186 | B2 * | 5/2011 | Grauman ............. G06K 9/4671 382/159 |
| 7,986,844 | B2 | 7/2011 | Diamant et al. |
| 8,003,186 | B2 | 8/2011 | Ishizaki et al. |
| 8,005,142 | B2 * | 8/2011 | Kim ...................... H04N 19/105 375/240.11 |
| 8,041,677 | B2 * | 10/2011 | Sumner ................ G06F 11/1453 707/640 |
| 8,086,052 | B2 * | 12/2011 | Toth ....................... H04N 19/52 382/232 |
| 8,099,415 | B2 * | 1/2012 | Luo .................... G06F 17/30569 707/736 |
| 8,099,601 | B2 * | 1/2012 | Serret-Avila .......... G06T 1/0071 713/170 |
| 8,107,527 | B1 | 1/2012 | Hobbs et al. |
| 8,126,282 | B2 | 2/2012 | Jung et al. |
| 8,197,397 | B2 | 6/2012 | Rovegno |
| 8,213,503 | B2 * | 7/2012 | Tu ..................... H04N 21/23438 375/240.03 |
| 8,264,489 | B2 | 9/2012 | Saint-Hilaire et al. |
| 8,284,484 | B2 | 10/2012 | Hoult et al. |
| 8,295,617 | B2 | 10/2012 | Collins |
| 8,320,683 | B2 | 11/2012 | Konishi |
| 8,335,255 | B2 | 12/2012 | Lee et al. |
| 8,411,750 | B2 | 4/2013 | Dane |
| 8,417,039 | B2 | 4/2013 | Albu et al. |
| 8,442,942 | B2 * | 5/2013 | Leppard ............ G06F 17/30159 707/616 |
| 8,515,123 | B2 | 8/2013 | Thorwirth |
| 8,619,857 | B2 | 12/2013 | Zhao et al. |
| 8,644,620 | B1 | 2/2014 | Lam |
| 8,681,870 | B2 | 3/2014 | Takada |
| 8,787,460 | B1 | 7/2014 | Hobbs |
| 8,897,512 | B1 | 11/2014 | Bozinovic et al. |
| 9,167,020 | B2 | 10/2015 | Abdo et al. |
| 9,223,534 | B1 | 12/2015 | Eilam |
| 9,225,979 | B1 | 12/2015 | Jia et al. |
| 9,235,313 | B2 | 1/2016 | Wu et al. |
| 9,277,237 | B2 | 3/2016 | Abiezzi et al. |
| 9,286,862 | B2 | 3/2016 | Peacock |
| 9,332,127 | B2 | 5/2016 | Ju |
| 2001/0001614 | A1 | 5/2001 | Boice et al. |
| 2002/0118755 | A1 | 8/2002 | Karczewicz et al. |
| 2003/0179951 | A1 | 9/2003 | Christiansen |
| 2004/0131014 | A1 | 7/2004 | Thompson et al. |
| 2004/0133548 | A1 | 7/2004 | Fielding et al. |
| 2004/0174570 | A1 | 9/2004 | Plunkett et al. |
| 2004/0223549 | A1 | 11/2004 | Karczewicz et al. |
| 2005/0166040 | A1 * | 7/2005 | Walmsley ............. B41J 2/04505 713/150 |
| 2006/0062303 | A1 | 3/2006 | Xu |
| 2006/0132931 | A1 | 6/2006 | Epple et al. |
| 2006/0153295 | A1 | 7/2006 | Wang et al. |
| 2006/0224594 | A1 * | 10/2006 | Goyal ............... G06F 17/30008 |
| 2007/0025442 | A1 | 2/2007 | Okada et al. |
| 2007/0036226 | A1 | 2/2007 | Kim et al. |
| 2007/0041066 | A1 | 2/2007 | Yasuda et al. |
| 2007/0053662 | A1 | 3/2007 | Tobita et al. |
| 2007/0116110 | A1 | 5/2007 | Diamant et al. |
| 2007/0199011 | A1 | 8/2007 | Zhang et al. |
| 2008/0104652 | A1 | 5/2008 | Swenson et al. |
| 2008/0212687 | A1 | 9/2008 | Liu |
| 2009/0022374 | A1 | 1/2009 | Boult |
| 2009/0115909 | A1 | 5/2009 | Walls et al. |
| 2009/0129466 | A1 | 5/2009 | Cho et al. |
| 2009/0244299 | A1 | 10/2009 | Fukunishi |
| 2010/0057750 | A1 | 3/2010 | Aasted et al. |
| 2010/0119170 | A1 | 5/2010 | Sengamedu et al. |
| 2010/0166073 | A1 | 7/2010 | Schmit et al. |
| 2010/0177893 | A1 | 7/2010 | Jeon et al. |
| 2010/0268836 | A1 * | 10/2010 | Jabri .................. H04L 47/38 709/231 |

(56) References Cited

U.S. PATENT DOCUMENTS

| | | | |
|---|---|---|---|
| 2010/0284460 A1* | 11/2010 | Tsai | H04N 19/176 375/240.12 |
| 2010/0284471 A1* | 11/2010 | Tsai | H04N 19/70 375/240.24 |
| 2010/0293248 A1 | 11/2010 | Kamay et al. | |
| 2011/0007801 A1 | 1/2011 | Andersson et al. | |
| 2011/0010396 A1 | 1/2011 | Zhou | |
| 2011/0044551 A1 | 2/2011 | Lee et al. | |
| 2011/0051809 A1 | 3/2011 | Lee | |
| 2011/0128810 A1 | 6/2011 | Sato | |
| 2011/0225114 A1 | 9/2011 | Gotthardt | |
| 2011/0243234 A1 | 10/2011 | Kondo et al. | |
| 2011/0293013 A1 | 12/2011 | Ma et al. | |
| 2011/0299785 A1 | 12/2011 | Albu et al. | |
| 2011/0311042 A1* | 12/2011 | Cheddad | G06F 21/602 380/28 |
| 2012/0057631 A1* | 3/2012 | Le Leannec | H04N 19/56 375/240.16 |
| 2012/0170653 A1 | 7/2012 | Panusopone et al. | |
| 2012/0245688 A1 | 9/2012 | Vanaclocha | |
| 2012/0294523 A1 | 11/2012 | Abdo et al. | |
| 2013/0013618 A1* | 1/2013 | Heller | G06F 17/3015 707/747 |
| 2013/0022113 A1* | 1/2013 | Chen et al. | H04N 19/597 375/240.12 |
| 2013/0034158 A1 | 2/2013 | Kirchhoffer et al. | |
| 2013/0034159 A1* | 2/2013 | Siekmann | H04N 19/176 375/240.12 |
| 2013/0036289 A1* | 2/2013 | Welnicki | G06F 3/0608 711/173 |
| 2013/0057646 A1* | 3/2013 | Chen et al. | H04N 19/597 348/43 |
| 2013/0057666 A1 | 3/2013 | Fujii | |
| 2013/0067344 A1 | 3/2013 | Ungureanu et al. | |
| 2013/0078592 A1 | 3/2013 | McCarthy | |
| 2013/0084018 A1* | 4/2013 | Nystad | G06K 9/36 382/232 |
| 2013/0114704 A1 | 5/2013 | Chen et al. | |
| 2013/0142447 A1* | 6/2013 | Park | G06T 9/004 382/233 |
| 2013/0147974 A1 | 6/2013 | Ju et al. | |
| 2013/0148721 A1* | 6/2013 | Chen | G09G 5/001 375/240.12 |
| 2013/0176560 A1 | 7/2013 | Wax et al. | |
| 2013/0208810 A1 | 8/2013 | Shen et al. | |
| 2013/0243089 A1* | 9/2013 | Lim | H04N 19/176 375/240.12 |
| 2013/0258052 A1 | 10/2013 | Li et al. | |
| 2013/0266073 A1 | 10/2013 | MacInnis et al. | |
| 2013/0266078 A1* | 10/2013 | Deligiannis | H04N 19/00533 375/240.25 |
| 2013/0268621 A1 | 10/2013 | Mese et al. | |
| 2013/0271565 A1 | 10/2013 | Chen et al. | |
| 2013/0272394 A1* | 10/2013 | Brockmann | G06T 9/00 375/240.12 |
| 2013/0279564 A1 | 10/2013 | Wang | |
| 2013/0279577 A1 | 10/2013 | Schwarz et al. | |
| 2013/0335527 A1* | 12/2013 | Takahashi | H04N 19/597 348/43 |
| 2014/0002603 A1* | 1/2014 | Takahashi | H04N 19/597 348/43 |
| 2014/0003506 A1 | 1/2014 | Wang et al. | |
| 2014/0010294 A1 | 1/2014 | Ye et al. | |
| 2014/0016698 A1* | 1/2014 | Joshi | H04N 19/88 375/240.12 |
| 2014/0029668 A1 | 1/2014 | Lim et al. | |
| 2014/0050413 A1* | 2/2014 | Sato | G06T 9/00 382/233 |
| 2014/0064360 A1 | 3/2014 | Rapaka et al. | |
| 2014/0092994 A1 | 4/2014 | Wang | |
| 2014/0321553 A1 | 10/2014 | Clark | |
| 2014/0369413 A1 | 12/2014 | Clark | |
| 2014/0369421 A1 | 12/2014 | Zhu et al. | |
| 2015/0054946 A1 | 2/2015 | Zhang | |
| 2015/0063451 A1 | 3/2015 | Zhu et al. | |
| 2015/0092840 A1 | 4/2015 | Mochizuki et al. | |
| 2016/0234530 A1 | 8/2016 | Xu et al. | |
| 2016/0241876 A1 | 8/2016 | Xu et al. | |
| 2016/0269732 A1 | 9/2016 | Li et al. | |
| 2016/0277733 A1 | 9/2016 | Li et al. | |
| 2016/0277761 A1 | 9/2016 | Li et al. | |
| 2017/0163999 A1 | 6/2017 | Li et al. | |
| 2017/0302936 A1 | 10/2017 | Li et al. | |
| 2018/0063540 A1 | 3/2018 | Zhu et al. | |
| 2018/0152699 A1 | 5/2018 | Kumar et al. | |

FOREIGN PATENT DOCUMENTS

| | | |
|---|---|---|
| CN | 1874519 | 12/2006 |
| CN | 101283578 | 10/2008 |
| CN | 101710324 | 5/2010 |
| CN | 101866366 | 10/2010 |
| CN | 102576411 | 7/2012 |
| CN | 103281538 | 9/2013 |
| CN | 103430549 | 12/2013 |
| CN | 103841426 | 6/2014 |
| CN | 104574440 | 4/2015 |
| EP | 1349395 | 10/1999 |
| EP | 2996360 | 3/2016 |
| GB | 2375673 | 11/2002 |
| GB | 2460844 | 12/2009 |
| JP | H11-66301 | 3/1999 |
| JP | 2005-522083 | 7/2005 |
| JP | 2010-508734 | 3/2010 |
| JP | 2013-058873 | 3/2013 |
| RU | 2298226 | 4/2007 |
| WO | WO 00/60874 | 10/2000 |
| WO | WO 02/093934 | 11/2002 |
| WO | WO 2010/085899 | 8/2010 |
| WO | WO 2010/086548 | 8/2010 |
| WO | WO 2011/103206 | 8/2011 |
| WO | WO 2011/153005 | 12/2011 |
| WO | WO 2013/068433 | 5/2013 |
| WO | WO 2013/072484 | 5/2013 |
| WO | WO 2013/103376 | 7/2013 |
| WO | WO 2013/159038 | 10/2013 |
| WO | WO 2015/131325 | 9/2015 |
| WO | WO 2015/139165 | 9/2015 |
| WO | WO 2016/018422 | 2/2016 |

OTHER PUBLICATIONS

Gaikar, "Techinline Remote Desktop Software: Access Your Computers Remotely," *Tricks Machine*, 6 pp. (Jan. 2012).

International Preliminary Report on Patentability dated Sep. 15, 2016, from International Patent Application No. PCT/CN2014/072834, 6 pp.

Praveen et al., "Analysis and Approximation of SAO Estimation for CTU-Level HEVC Encoder," *Proc. Of Visual Communications and Image Processing*, 5 pp. (Nov. 2013).

Rane, "Hash-Aided Motion Estimation and Rate Control for Distributed Video Coding," EE392J Project Report, 10 pp. (Dec. 2004).

Sangi et al., "Global Motion Estimation Using Block Matching with Uncertainty Analysis," *Signal Processing Conference*, pp. 1823-1827 (Sep. 2007).

Sun et al., "Motion-Embedded Residual Error for Packet Loss Recovery of Video Transmission and Encryption," *Visual Communications and Image Processing*, vol. 6077, 14 pp. (Jan. 2006).

Wu et al., "Linear Hashtable Method Predicted Hexagonal Search Algorithm with Spatial Related Criterion," *Lecture Notes in Computer Science*, pp. 1208-1217 (Jun. 2005).

Zhu et al., "2-D Dictionary Based Video Coding for Screen Contents," *Data Compression Conf.*, pp. 43-52 (Mar. 2014).

Zhu et al., "Screen content coding using 2-D dictionary mode," JCTVC-O0355, 4 pp. (Oct. 2013).

Ascenso et al., "Adaptive Hash-Based Side Information Exploitation for Efficient Wyner-Ziv Video Coding," *IEEE Int'l Conf. on Image Processing*, 4 pp. (Sep. 2007)

(56) References Cited

OTHER PUBLICATIONS

Bankoski et al., "VP8 Data Format and Decoding Guide," RFC 6386, 304 pp. (Nov. 2011).
Flynn et al., "High Efficiency Video Coding (HEVC) Range Extensions text specification: Draft 4," JCTVC-N1005, 322 pp. (Apr. 2013).
Flynn et al., "High Efficiency Video Coding (HEVC) Range Extensions text specification: Draft 6," JCTVC-P1005_v1, 355 pp. (Jan. 2014).
International Search Report and Written Opinion dated Dec. 3, 2014, from International Patent Application No. PCT/CN2014/072834, 13 pp.
ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ITU-T Recommendation H.261, "Video Codec for Audiovisual Services at p×64 kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Kwon et al., "AHG5: Fast encoding using early skipping of Intra block copy (IntraBC) search," JCTVC-O0245, 9 pp. (Oct. 2013).
Li et al., "Description of screen content coding technology proposal by Microsoft," JCTVC-Q0035, 27 pp. (Mar. 2014).
Li et al., "Hash-based intraBC search," JCTVC-Q0252, 2 pp. (Mar. 2014).
Li et al., "Hash-based motion search," JCTVC-Q0245, 5 pp. (Mar. 2014).
Li et al., "Low complexity encoders for JCTVC-Q0035," JCTVC-Q0052, 4 pp. (Mar. 2014).
Robert et al., "Improving Intra mode coding in H.264/AVC through block oriented transforms," *IEEE 8th Workshop on Multimedia Signal Processing*, 5 pp. (Oct. 2006).
Shah et al., "HD Resolution Intra Prediction Architecture for H.264 Decoder," *IEEE Int'l Conf. on VLSI Design*, pp. 107-112 (Jan. 2012).
SMPTE Standard, "VC-1 Compressed Video Bitstream Format and Decoding Process," SMPTE 421M-2006, 493 pp. (Feb. 2006).
Yang et al., "MyFinder: Near-Duplicate Detection for Large Image Collections," *ACM Int'l Conf. on Multimedia*, pp. 1013-1014 (Oct. 2009).
Zhu et al., "Screen content coding using 2-D dictionary mode," JCTVC-O0357, 4 pp. (Oct. 2013).
Chen et al., "Description of Screen Content Coding Technology Proposal by Qualcomm," JCTVC-Q0031, 18 pp. (Mar. 2014).
Chum et al., "Scalable Near Identical Image and Shot Detection", In Proceedings of International Conference on Image and Video Retrieval, Jul. 9, 2007, pp. 549-556.
Communication pursuant to Article 94(3) dated Jun. 14, 2017, from European Patent Application No. 14885049.8, 7 pp.
Communication pursuant to Rule 164(1) EPC dated Feb. 16, 2017, from European Patent Application No. 14885049.8, 7 pp.
Gargi et al., "Performance Characterization of Video-Shot-Change Detection Methods", In IEEE Transactions on Circuits and Systems for Video Technology, vol. 10, Issue 1, Feb. 1, 2000, 13 Pages.
Invitation pursuant to Article 94(3) and Rule 71(1) EPC dated Oct. 26, 2017, from European Patent Application No. 14885049.8, 5 pp.
Li et al., "Adaptive Motion Vector Resolution for Screen Content," JCTVC-R0106 r1, ITU-T SG16 WP 3 and ISO/IEC JTC1/SC29/WG11, 18th Meeting, 16 pp. (Jun. 2014).

Li et al., "An HEVC-Based Screen Content Coding Scheme," JCTVC ITU-T SG16 WP3 and ISO/IEC JTC1/SC29/WG11 17th Meeting, 13 pp. (Mar. 27, 2014).
Li et al., "Screen Content Coding Using Dictionary Based Mode," JCTVC-P0214_r1, 5 pp. (Jan. 2014).
Monga et al, "Perceptual Image Hashing Via Feature Points: Performance Evaluation and Tradeoffs," IEEE Transactions Image Processing, pp. 3452-3465 (Nov. 2006).
Notice on the First Office Action dated Feb. 5, 2018, from Chinese Patent Application No. 201480029780.0, 14 pp.
Ribas-Corbera et al., "Optimizing Motion-Vector Accuracy in Block-Based Video Coding," *IEEE Trans. On Circuits and Systems for Video Technology*, vol. 11, No. 4, pp. 497-511 (Apr. 2001).
Supplementary European Search Report dated May 18, 2017, from European Patent Application No. 14885049.8, 6 pp.
Tagliasacchi et al., "Hash-Based Motion Modeling in Wyner-Ziv Video Coding," *IEEE Int'l Conf on Acoustics, Speech, and Signal Processing*, 4 pp. (Apr. 2007).
Wei et al., "An Efficient Intra-Mode Selection Algorithm for H.264 Based on Edge Classification and Rate-Distortion Estimation," Signal Processing: Image Communication vol. 23, No. 9, pp. 699-710, Oct. 1, 2008 (retrieved Aug. 22, 2008).
Wikipedia, "Locality-sensitive Hashing" 7 pp. (document marked: "last edited on Feb. 6, 2018").
Yu et al., "New Intra Prediction using Intra-Macroblock Motion Compensation," JVT-C151, 10 pp. (May 2002).
Zhou et al., "Motion Vector Resolution Control for Screen Content Coding," JCTVC-P0277, 6 pp. (Jan. 2014).
Pauleve et al., "Locality Sensitive Hashing: A Comparison of Hash Function Types and Querying Mechanisms," *Pattern Recognition Letters*, vol. 31, No. 11, pp. 1348-1358 (Aug. 2010).
Wikipedia, "Locality-sensitive Hashing" 6 pp. (document marked: "last modified on Apr. 18, 2013").
Brasnett et al., "Comments & Results on MPEG-7 Image Signature," MPEG2008/M15863, 4 pp. (Oct. 2008).
Communication pursuant to Article 94(3) EPC dated Aug. 25, 2016, from European Patent Application No. 13895864.0, 7 pp.
Communication pursuant to Article 94(3) EPC dated Feb. 8, 2017, from European Patent Application No. 14884278.4, 5 pp.
Communication pursuant to Article 94(3) dated Jul. 6, 2017, from European Patent Application No. 14895767.3, 8 pp.
Communication pursuant to Article 94(3) EPC dated Apr. 5, 2017, from European Patent Application No. 13895864.0, 4, pp.
Communication pursuant to Article 94(3) EPC dated Jan. 10, 2018, from European Patent Application No. 13895864.0, 4 pp.
Communication pursuant to Article 94(3) EPC dated Mar. 15, 2018, from European Patent Application No. 14895767.3, 5 pp.
Communication pursuant to Article 94(3) EPC dated Apr. 4, 2018, from European Patent Application No. 13896175.0, 6 pp.
Communication pursuant to Article 94(3) EPC dated May 24, 2018, from European Patent Application No. 13895864.0, 5 pp.
Communication pursuant to Article 94(3) EPC dated Feb. 16, 2018, from European Patent Application No. 14903205.4, 11 pp.
Examination Report dated Sep. 29, 2016, from European Patent Application No. 13896175.0, 8 pp.
Final Office Action dated Apr. 6, 2018, from U.S. Appl. No. 15/024,812, 123 pp.
Final Office Action dated Apr. 9, 2018, from U.S. Appl. No. 15/321,536, 58 pp.
International Preliminary Report on Patentability dated May 6, 2016, from International Patent Application No. PCT/CN2013/085939, 6 pp.
International Preliminary Report on Patentability dated May 6, 2016, from International Patent Application No. PCT/CN2013/085937, 7 pp.
International Preliminary Report on Patentability dated Sep. 15, 2016, from International Patent Application No. PCT/CN2014/072827, 6 pp.
International Preliminary Report on Patentability dated Jan. 5, 2017, from International Patent Application No. PCT/CN2014/080481, 7 pp.

(56) References Cited

OTHER PUBLICATIONS

International Search Report and Written Opinion dated Jun. 10, 2014, from International Patent Application No. PCT/CN2013/085937, 12 pp.
International Search Report and Written Opinion dated Jul. 30, 2014, from International Patent Application No. PCT/CN2013/085939, 12 pp.
International Search Report and Written Opinion dated Dec. 10, 2014, from International Patent Application No. PCT/CN2014/072827, 12 pp.
International Search Report and Written Opinion dated Mar. 2, 2015, from International Patent Application No. PCT/CN2014/080481, 13 pp.
International Search Report and Written Opinion dated Jul. 1, 2015, from International Patent Application No. PCT/CN2014/087869, 12 pp.
International Search Report and Written Opinion dated May 3, 2018, from International Patent Application No. PCT/US2017/063164, 30 pp.
International Search Report and Written Opinion dated Jan. 24, 2018, from International Patent Application No. PCT/US2017/057066, 12 pp.
Invitation pursuant to Article 94(3) and Rule 71(1) EPC dated May 31, 2017, from European Patent Application No. 14884278.4, 3 pp.
Li et al., "A Unified Framework of Hash-based Matching for Screen Content Coding," *IEEE VCIP*, pp. 530-533 (Dec. 2014).
Li et al., "RDPCM operation unification and cleanup," JCTVC-00185, pp. 1-6 (Oct. 2013).
Notice on Grant of Patent dated Jun. 5, 2018, from Chinese Patent Application No. 201380080482.X, 4 pp.
Notice on the First Office Action dated Jun. 2, 2017, from Chinese Patent Application No. 201380080482.X, 13 pp.
Notice on the First Office Action dated Jan. 17, 2018, from Chinese Patent Application No. 201480030627.X, 14 pp.
Notice on the First Office Action dated Mar. 20, 2018, from Chinese Patent Application No. 201380080483.4, 12 pp.
Notice on the First Office Action dated May 3, 2018, from Chinese Patent Application No. 201480048046.9, 12 pp.
Notice on the Second Office Action dated Jan. 4, 2018, from Chinese Patent Application No. 201380080482.X, 7 pp.
Office Action dated May 1, 2018, from U.S. Appl. No. 15/253,568, 7 pp.
Rapaka et al., "Improved Intra Block Copy and Motion Search Methods for Screen Content Coding," *Visual Communications and Image Processing*, vol. 9599, pp. (Sep. 2015).
Riguer et al., "Real-Time Depth of Field Simulation," *ShaderX2: Shader Programming Tips and Tricks with DirectX 9*, pp. 1-30 (Jan. 2003).
Supplementary European Search Report dated Jul. 5, 2016, from European Patent Application No. 13895864.0, 4 pp.
Supplementary European Search Report dated Sep. 14, 2016, from European Patent Application No. 13896175.0, 6 pp.
Supplementary European Search Report dated Jan. 31, 2017, from European Patent Application No. 14884278.4, 4 pp.
Supplementary European Search Report dated Jun. 14, 2017, from European Patent Application No. 14895767.3, 5 pp.
Supplementary Partial European Search Report dated Sep. 27, 2017, from European Patent Application No. 14903205.4, 14 pp.
Supplementary European Search Report dated Jan. 29, 2018, from European Patent Application No. 14903205.4, 9 pp.
Communication under Rule 71(3) EPC dated Feb. 22, 2019, from European Patent Application No. 14895767.3, 5 pp.
Notice on the Third Office Action dated Mar. 13, 2019, from Chinese Patent Application No. 201480030627.X, 6 pp.
Office Action dated Mar. 12, 2019, from U.S. Appl. No. 15/029,589, 79 pp.
Extended European Search Report dated Aug. 21, 2018, from European Patent Application No. 18176302.0, 5 pp.
Final Office Action dated Nov. 21, 2018, from U.S. Appl. No. 15/029,589, 50 pp.
First Office Action and Search Report dated Jul. 19, 2018, from Chinese Patent Application No. 201480071892.2, 10 pp.
International Preliminary Report on Patentability dated Apr. 13, 2017, from International Patent Application No. PCT/CN2014/087869, 6 pp.
Li et al., "Improvement for hash based inter search," JCTVC-S0089, 4 pp. (Oct. 2014).
Liu et al., "Motion Feature and Hadamard Coefficient-Based Fast Multiple Reference Frame Motion Estimation for H.264," *IEEE Trans. on Circuits and Systems for Video Technology*, vol. 18, No. 5, pp. 620-632 (May 2008).
Notice of Allowance dated Oct. 23, 2018, from U.S. Appl. No. 15/253,568, 8 pp.
Notice on the Second Office Action dated Sep. 29, 2018, from Chinese Patent Application No. 201480030627.X, 13 pp.
Notice on the Second Office Action dated Oct. 29, 2018, from Chinese Patent Application No. 201480029780.0, 11 pp.
Notice on Second Office Action dated Nov. 29, 2018, from Chinese Patent Application No. 201380080483.4, 6 pp.
Notice on the Second Office Action dated Jan. 23, 2019, from Chinese Patent Application No. 201480048046.9, 6 pp.
Office Action dated Jul. 31, 2018, from U.S. Appl. No. 15/029,589, 45 pp.
Office Action dated Aug. 27, 2018, from U.S. Appl. No. 15/365,927, 22 pp.
Office action dated Jul. 12, 2018, from Russian Patent Application No. 2017110461, 7 pp.
Office action dated Jun. 26, 2018, from Japanese Patent Application No. 2017517045, 7 pp.
Office Action dated Oct. 4, 2017, from U.S. Appl. No. 15/024,812, 75 pp.
Office Action dated Sep. 28, 2017, from U.S. Appl. No. 15/024,816, 45 pp.
Office Action dated Oct. 2, 2017, from U.S. Appl. No. 15/024,816, 44 pp.
Office Action dated Oct. 1, 2018, from U.S. Appl. No. 15/024,816, 59 pp.
Office Action dated Oct. 13, 2017, from U.S. Patent Appl. No. 15/321,536, 52 pp.
Office Action dated Oct. 9, 2018, from U.S. Appl. No. 15/321,536, 65 pp.
Search Report dated Sep. 27, 2018, from European Patent Application No. 18176304.6, 8 pp.

* cited by examiner software 180 implementing one or more innovations for block flipping and/or skip mode in intra block copy prediction

500

BV (761) for current block (760) in current frame (710), indicating a displacement to a reference region (780) in the current frame (710)

BV (751) of previous intra BC predicted block (750) used as BV predictor for BV (761) for current block (760) in current frame (710)

BV (861) for current block (860) in current picture (810), indicating a displacement to a reference region (880) in the current picture (810)

current block (860) in picture reference region (880) at displacement indicated by BV value (861) for current block (860), without flipping flipped reference region (881), for reference region (880) with horizontal and vertical flipping

Figure 9a

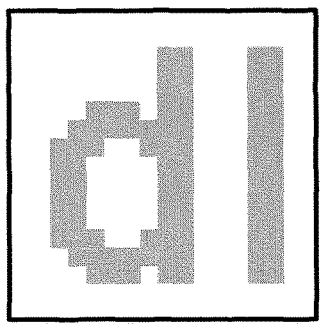

current block (960)

Figure 9b

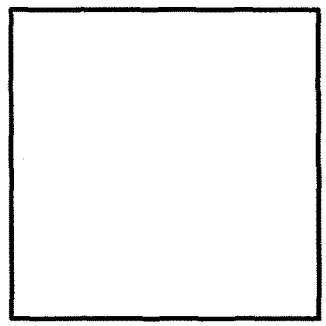

reference region (980) at displacement indicated by BV value for current block (960), without flipping

Figure 9c

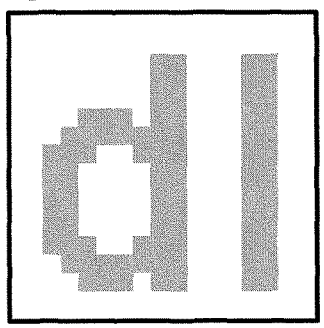

flipped reference region (981), for reference region (980) with horizontal flipping

Figure 10a

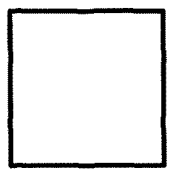

current block (1060)

Figure 10b

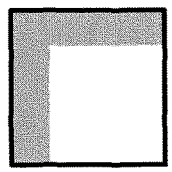

reference region (1080) at displacement indicated by BV value for current block (1060), without flipping

Figure 10c

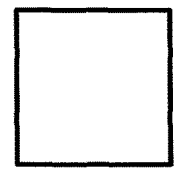

flipped reference region (1081), for reference region (1080) with vertical flipping

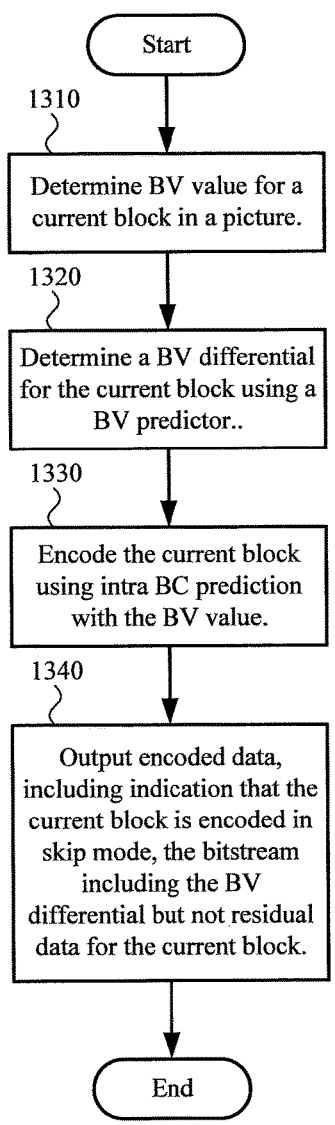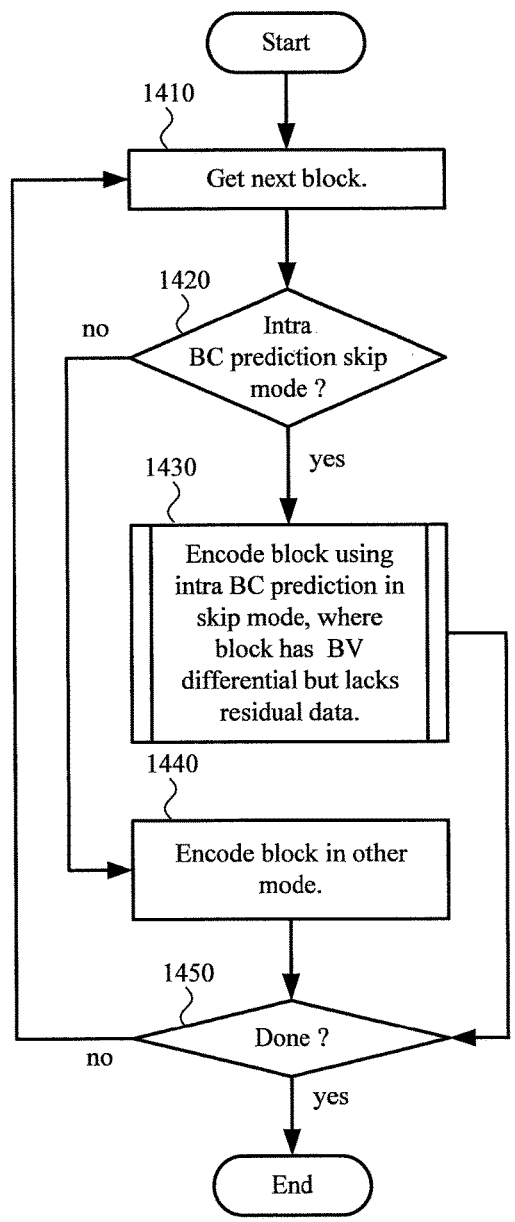

Figure 17a  1700

| coding_unit( x0, y0, log2CbSize ) { | Descriptor |
|---|---|
| if( transquant_bypass_enabled_flag ) | |
|   cu_transquant_bypass_flag | ae(v) |
| if( slice_type != I ) | |
|   cu_skip_flag[ x0 ][ y0 ] | ae(v) |
| nCbS = ( 1 << log2CbSize ) | |
| if( cu_skip_flag[ x0 ][ y0 ] ) | |
|   prediction_unit( x0, y0, nCbS, nCbS ) | |
| else { | |
|   if( intra_block_copy_enabled_flag ) | |
|     intra_bc_flag[ x0 ][ y0 ] | ae(v) |
|   if( slice_type != I && !intra_bc_flag[ x0 ][ y0 ] ) | |
|     pred_mode_flag | ae(v) |
|   if( CuPredMode[ x0 ][ y0 ] != MODE_INTRA \|\| intra_bc_flag[ x0 ][ y0 ] \|\| log2CbSize == MinCbLog2SizeY ) | |
|     part_mode | ae(v) |
|   if( CuPredMode[ x0 ][ y0 ] == MODE_INTRA ) { | |
|     if( PartMode == PART_2Nx2N && pcm_enabled_flag && !intra_bc_flag[ x0 ][ y0 ] && log2CbSize >= Log2MinIpcmCbSizeY && log2CbSize <= Log2MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( x0, y0, log2CbSize ) | |
|     } else if( intra_bc_flag[ x0 ][ y0 ] ) { | |
|       mvd_coding( x0, y0, 2) | |
|       if( PartMode == PART_2NxN ) | |
|         mvd_coding( x0, y0 + ( nCbS / 2 ), 2) | |
|       else if( PartMode == PART_Nx2N ) | |
|         mvd_coding( x0 + ( nCbS / 2 ), y0, 2) | |
|       else if( PartMode == PART_NxN ) { | |
|         mvd_coding( x0 + ( nCbS / 2 ), y0, 2) | |
|         mvd_coding( x0, y0 + ( nCbS / 2 ), 2) | |
|         mvd_coding( x0 + ( nCbS / 2 ), y0 + ( nCbS / 2 ), 2) | |
|       } | |
|     } else { | |
|       pbOffset = ( PartMode == PART_NxN ) ? ( nCbS / 2 ) : nCbS | |
|       for( j = 0; j < nCbS; j = j + pbOffset ) | |
|         for( i = 0; i < nCbS; i = i + pbOffset ) | |
|           prev_intra_luma_pred_flag[ x0 + i ][ y0 + j ] | ae(v) |
|       for( j = 0; j < nCbS; j = j + pbOffset ) | |
|         for( i = 0; i < nCbS; i = i + pbOffset ) | |
|           if( prev_intra_luma_pred_flag[ x0 + i ][ y0 + j ] ) | |
|             mpm_idx[ x0 + i ][ y0 + j ] | ae(v) |
|           else | |
|             rem_intra_luma_pred_mode[ x0 + i ][ y0 + j ] | ae(v) |

Figure 17b  1700

| | |
|---|---|
| if( ChromaArrayType == 3 ) | |
|    for( j = 0; j < nCbS; j = j + pbOffset ) | |
|      for( i = 0; i < nCbS; i = i + pbOffset ) | |
|        intra_chroma_pred_mode[ x0 + i ][ y0 + j ] | ae(v) |
|    else if( ChromaArrayType != 0 ) | |
|      intra_chroma_pred_mode[ x0 ][ y0 ] | ae(v) |
|   } | |
| } else { | |
|   if( PartMode == PART_2Nx2N ) | |
|     prediction_unit( x0, y0, nCbS, nCbS ) | |
|   else if( PartMode == PART_2NxN ) { | |
|     prediction_unit( x0, y0, nCbS, nCbS / 2 ) | |
|     prediction_unit( x0, y0 + ( nCbS / 2 ), nCbS, nCbS / 2 ) | |
|   } else if( PartMode == PART_Nx2N ) { | |
|     prediction_unit( x0, y0, nCbS / 2, nCbS ) | |
|     prediction_unit( x0 + ( nCbS / 2 ), y0, nCbS / 2, nCbS ) | |
|   } else if( PartMode == PART_2NxnU ) { | |
|     prediction_unit( x0, y0, nCbS, nCbS / 4 ) | |
|     prediction_unit( x0, y0 + ( nCbS / 4 ), nCbS, nCbS * 3 / 4 ) | |
|   } else if( PartMode == PART_2NxnD ) { | |
|     prediction_unit( x0, y0, nCbS, nCbS * 3 / 4 ) | |
|     prediction_unit( x0, y0 + ( nCbS * 3 / 4 ), nCbS, nCbS / 4 ) | |
|   } else if( PartMode == PART_nLx2N ) { | |
|     prediction_unit( x0, y0, nCbS / 4, nCbS ) | |
|     prediction_unit( x0 + ( nCbS / 4 ), y0, nCbS * 3 / 4, nCbS ) | |
|   } else if( PartMode == PART_nRx2N ) { | |
|     prediction_unit( x0, y0, nCbS * 3 / 4, nCbS ) | |
|     prediction_unit( x0 + ( nCbS * 3 / 4 ), y0, nCbS / 4, nCbS ) | |
|   } else { /* PART_NxN */ | |
|     prediction_unit( x0, y0, nCbS / 2, nCbS / 2 ) | |
|     prediction_unit( x0 + ( nCbS / 2 ), y0, nCbS / 2, nCbS / 2 ) | |
|     prediction_unit( x0, y0 + ( nCbS / 2 ), nCbS / 2, nCbS / 2 ) | |
|     prediction_unit( x0 + ( nCbS / 2 ), y0 + ( nCbS / 2 ), nCbS / 2, nCbS / 2 ) | |
|   } | |
| } | |
| if( !pcm_flag[ x0 ][ y0 ] ) { | |
|   if( CuPredMode[ x0 ][ y0 ] != MODE_INTRA && <br>    !( PartMode == PART_2Nx2N && merge_flag[ x0 ][ y0 ] ) \|\| <br>    ( CuPredMode[ x0 ][ y0 ] == MODE_INTRA && intra_bc_flag[ x0 ][ y0 ] ) ) | |
|     rqt_root_cbf | ae(v) |
|   if( rqt_root_cbf ) { | |
|     MaxTrafoDepth = ( CuPredMode[ x0 ][ y0 ] == MODE_INTRA ? <br>          ( max_transform_hierarchy_depth_intra + IntraSplitFlag ) : <br>          max_transform_hierarchy_depth_inter ) | |
|     transform_tree( x0, y0, x0, y0, log2CbSize, 0, 0 ) | |
|   } | |
| } | |
| } | |
| } | |

Figure 18    1800

| coding_unit( x0, y0, log2CbSize ) { | Descriptor |
|---|---|
| if( transquant_bypass_enabled_flag ) | |
|    cu_transquant_bypass_flag | ae(v) |
| if( slice_type != I ) | |
|    cu_skip_flag[ x0 ][ y0 ] | ae(v) |
| nCbS = ( 1 << log2CbSize ) | |
| if( cu_skip_flag[ x0 ][ y0 ] ) | |
|    prediction_unit( x0, y0, nCbS, nCbS ) | |
| else { | |
|    if( intra_block_copy_enabled_flag ) { | |
|      intra_bc_skip_flag[ x0 ][ y0 ] | ae(v) |
|      if( ! intra_bc_skip_flag[ x0 ][ y0 ]) | |
|        intra_bc_flag[ x0 ][ y0 ] | ae(v) |
|    } | |
|    if( slice_type != I && !intra_bc_flag[ x0 ][ y0 ] ) | |
|      pred_mode_flag | ae(v) |
|    if( CuPredMode[ x0 ][ y0 ] != MODE_INTRA \|\| (intra_bc_flag[ x0 ][ y0 ] && !intra_bc_skip_flag[ x0 ][ y0 ]) \|\| log2CbSize == MinCbLog2SizeY ) | |
|      part_mode | ae(v) |
|    ...... | |
|    ...... | |
|    if( !pcm_flag[ x0 ][ y0 ] ) { | |
|      if( CuPredMode[ x0 ][ y0 ] != MODE_INTRA && !( PartMode == PART_2Nx2N && merge_flag[ x0 ][ y0 ] ) \|\| ( CuPredMode[ x0 ][ y0 ] == MODE_INTRA && intra_bc_flag[ x0 ][ y0 ] && !intra_bc_skip_flag[ x0 ][ y0 ] && PartMode != PART_2Nx2N ) ) | |
|        rqt_root_cbf | ae(v) |
|      if( rqt_root_cbf ) { | |
|        MaxTrafoDepth = ( CuPredMode[ x0 ][ y0 ] == MODE_INTRA ? ( max_transform_hierarchy_depth_intra + IntraSplitFlag ) : max_transform_hierarchy_depth_inter ) | |
|        transform_tree( x0, y0, x0, y0, log2CbSize, 0, 0 ) | |
|      } | |
|    } | |
|    } | |
| } | |

1900 block vectors (1941, 1942, 1943, 1944) indicating displacements to candidate blocks for current block (1930) of current frame (1910)

Figure 20    2000    $h(B_{current}) = h_3$ $h_0$ :   $B(1266, 263), B(1357, 365), B(1429, 401), B(502, 464), \ldots$ $h_1$ :   $B(1704, 154), B(1709, 177), B(1158, 242)$ $h_2$ :   $B(1321, 49), B(145, 182), B(599, 490), B(1668, 511), \ldots$ $h_3$ :   $B(569, 73), B(1293, 102), B(401, 290), B(455, 306), \ldots$ $h_4$ :   $B(1119, 46)$ $h_5$ :   $B(1381, 11), B(1676, 53), B(38, 119), B(1633, 184), \ldots$ $h_6$ :   $B(979, 85), B(1013, 177), B(575, 470), B(900, 477), \ldots$

．
．
．

$h_{n-1}$ :   $B(794, 14), B(1479, 17), B(19, 317), B(1338, 374), \ldots$

Figure 21a   2100

$h_0$:   entry(0, 0), entry(0, 1), entry(0, 2), entry(0, 3), . . .

$h_1$:   entry(1, 0), entry(1, 1), entry(1, 2), entry(1, 3), . . .

$h_2$:

$h_3$:   entry(3, 0), entry(3, 1), entry(3, 2), entry(3, 3)

$h_4$:   entry(4, 0), entry(4, 1), entry(4, 2), entry(4, 3), . . .

$h_5$:   entry(5, 0), entry(5, 1), entry(5, 2), entry(5, 3), . . .

$h_6$:   entry(6, 0), entry(6, 1)

.
.
.

$h_{n-1}$:   entry(n-1, 0), entry(n-1, 1), entry(n-1, 2), entry(n-1, 3), . . .

Figure 21b   2110

*entry($h_i$, k)*:   address of B

Figure 21c   2120

*entry($h_i$, k)*:   address of B and hash value h'(B) from $2^{nd}$ hash function h'()

Figure 22a   2200

$h(B_{current}) = h_2$

- $h_0$:    $h'_0$ list, $h'_1$ list, $h'_2$ list, $h'_3$ list, . . .
- $h_1$:    $h'_0$ list, $h'_1$ list, $h'_2$ list, $h'_3$ list, . . .
- $h_2$:    $h'_0$ list, $h'_1$ list, $h'_2$ list, $h'_3$ list, . . .
- $h_3$:    $h'_0$ list, $h'_1$ list, $h'_2$ list, $h'_3$ list, . . .
- . . .
- $h_{n1-1}$:    $h'_0$ list, $h'_1$ list, $h'_2$ list, $h'_3$ list, . . .

Figure 22b   2210

$h'(B_{current}) = h'_0$

- $h'_0$:    entry(0, 0), entry(0, 1), entry(0, 2), entry(0, 3), . . .
- $h'_1$:    entry(1, 0), entry(1, 1), entry(1, 2), entry(1, 3), . . .
- $h'_2$:
- $h'_3$:    entry(3, 0), entry(3, 1), entry(3, 2), entry(3, 3)
- . . .
- $h'_{n2-1}$:    entry(n2-1, 0), entry(n2-1, 1), entry(n2-1, 2), . . .

Figure 22c   2220 entry($h'_i$, k) :    address of B

2300

2400

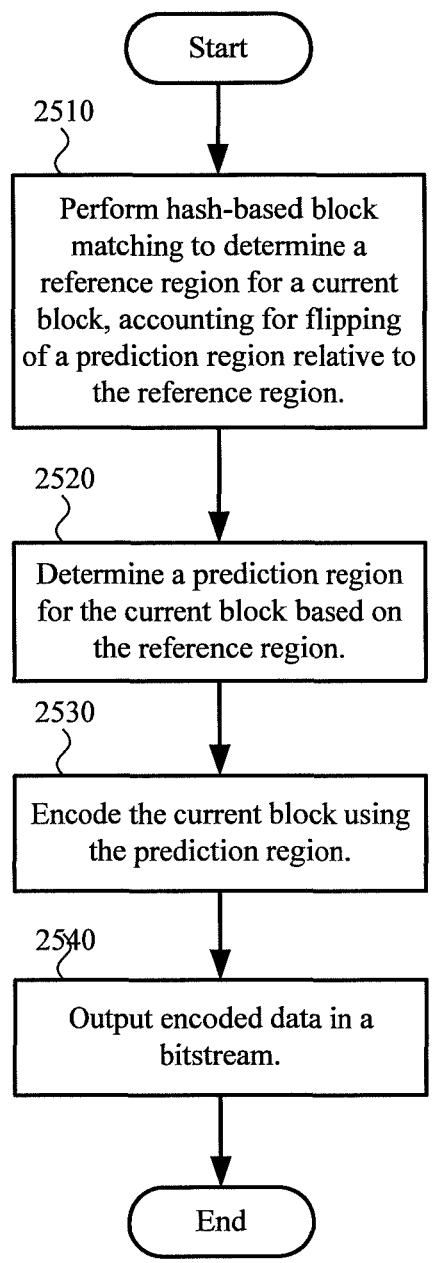
Figure 25        2500

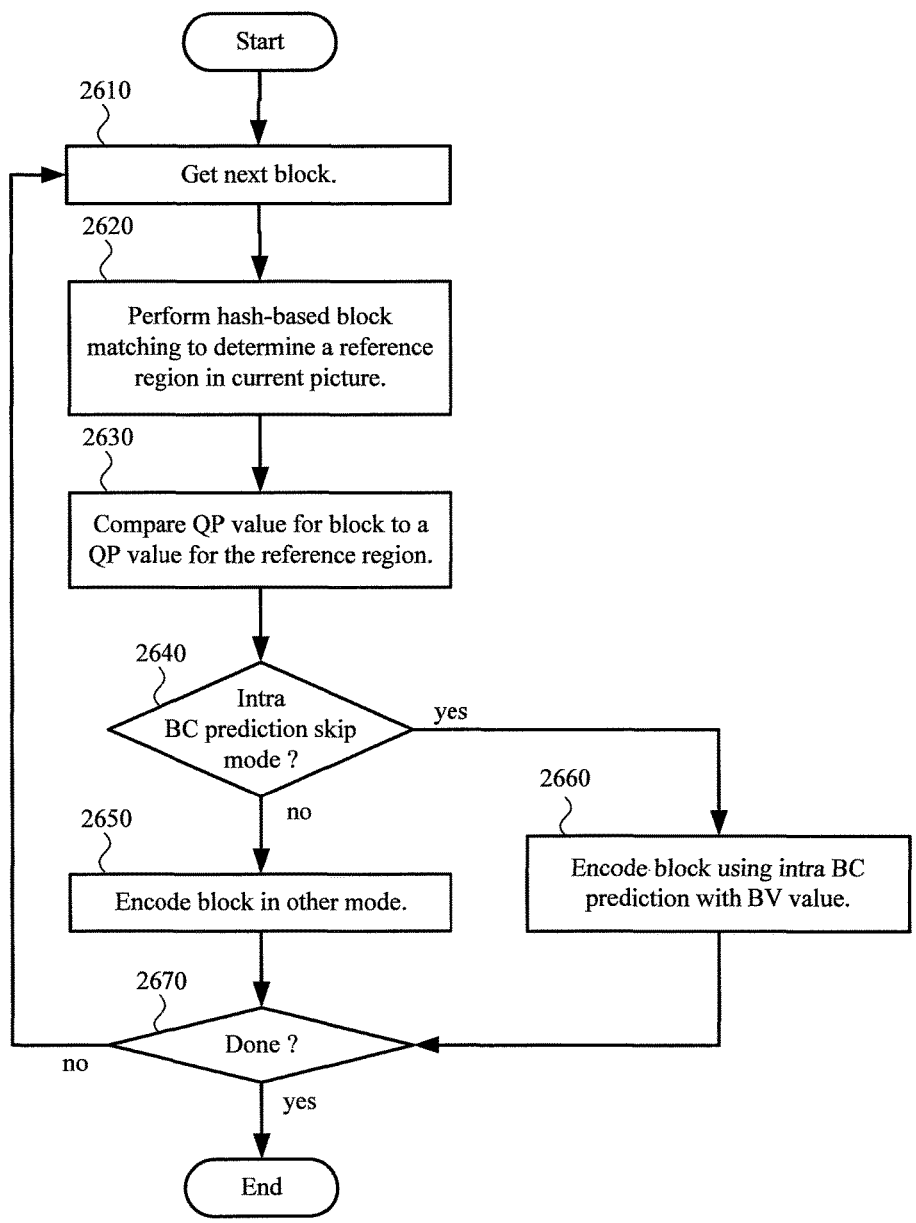

ENCODER-SIDE DECISIONS FOR BLOCK FLIPPING AND SKIP MODE IN INTRA BLOCK COPY PREDICTION

CROSS REFERENCE TO RELATED APPLICATIONS

This is the U.S. National Stage of International Application No. PCT/CN2014/072834, filed Mar. 4, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Intra block copy ("BC") is a prediction mode under development for H.265/HEVC extensions. For intra BC prediction mode, the sample values of a current block in a picture are predicted using previously reconstructed sample values in the same picture. A block vector ("BV") indicates a displacement from the current block to a region in the picture that includes the previously reconstructed sample values used for prediction. The BV is signaled in the bitstream. Intra BC prediction is a form of intra-picture prediction-intra BC prediction for a block in a picture does not use any sample values other than sample values in the same picture.

As currently specified in the H.265/HEVC standard and implemented in some reference software for the H.265/HEVC standard, intra BC prediction mode has several problems. In particular, coding of blocks with predictable BC displacement is not efficiently handled, and intra BC prediction for content with reversed patterns is not efficiently handled.

SUMMARY

In summary, the detailed description presents innovations in the area of encoding blocks using prediction. For example, some of the innovations relate to encoder-side decisions about when to use block flipping during prediction. Other innovations relate to encoder-side decisions about when to use skip mode for a block predicted using intra block copy ("BC") prediction.

According to a first aspect of the innovations described herein, an encoder performs hash-based block matching to determine a reference region for a current block in a current picture. The hash-based block matching accounts for flipping of a prediction region for the current block relative to the reference region. For example, as part of the hash-based block matching, the encoder flips the current block, determines a block hash value for the flipped current block, and then searches a hash table to identify any of multiple candidate blocks having a block hash value that matches that of the flipped current block. The hash table organizes the candidate blocks according to their block hash values. Or, as another example, a hash table organizes candidate blocks according to their block hash values, and the hash table also organizes at least some flipped versions of the candidate blocks according to their block hash values. As part of the hash-based block matching, the encoder can determine a block hash value for the current block, and then search the hash table to identify any of the candidate blocks and the flipped versions of the candidate blocks having a block hash value that matches that of the current block.

For block vector ("BV") estimation, the current picture includes the candidate blocks. For motion estimation, a reference picture includes the candidate blocks. The candidate blocks can include blocks with the same block size or different block sizes.

The encoder determines a prediction region for the current block based on the reference region. The prediction region can be flipped relative to the reference region. For example, the prediction region is flipped horizontally relative to the reference region and/or flipped vertically relative to the reference region.

The encoder encodes the current block using the prediction region and outputs encoded data in a bitstream. For example, the encoded data includes a BV value for the block that indicates a displacement to the reference region. Or, the encoded data includes a motion vector ("MV") value for the current block that indicates a displacement to the reference region.

According to a second aspect of the innovations described herein, an encoder decides whether a current block in a current picture is to be encoded using intra BC prediction in skip mode. When making the decision, the encoder performs hash-based block matching to determine a reference region in the current picture. For example, the encoder checks that, as a condition of the current block being encoded using intra BC prediction in skip mode, input sample values of the reference region identically match corresponding input sample values of the current block. When making the decision, the encoder can also compare a quantization parameter ("QP") value for the current block to a QP value for the reference region. For example, the encoder checks that, as a condition of the current block being encoded using intra BC prediction in skip mode, the QP value for the current block is greater than or equal to the QP value for the reference region. Or, instead of checking QP values for the block and reference region, the encoder evaluates residual values for the block relative to the reference region.

When the current block is to be encoded using intra BC prediction in skip mode, the encoder determines a BV value for the current block. The BV value for the current block indicates a displacement to the reference region. The encoder encodes the current block using intra BC prediction with the BV value. The encoder then outputs in a bitstream encoded data. Since the current block is encoded using intra BC prediction in skip mode, the bitstream lacks residual data for the current block.

The innovations can be implemented as part of a method, as part of a computing device adapted to perform the method or as part of a tangible computer-readable media storing computer-executable instructions for causing a computing device to perform the method. The various innovations can be used in combination or separately. In particular, the described encoder-side decisions for block flipping in intra BC prediction can be used in conjunction with the described encoder-side decisions for skip mode for intra-BC-predicted blocks.

The foregoing and other objects, features, and advantages of the invention will become more apparent from the following detailed description, which proceeds with reference to the accompanying figures.

BRIEF DESCRIPTION OF THE DRAWINGS

FIGS. 8a-8d, 9a-9c and 10a-10c are diagrams illustrating flipping of reference regions for blocks.

FIGS. 13 and 14 are flowcharts illustrating techniques for encoding that includes skip mode for intra-BC-predicted blocks.

FIGS. 17a and 17b are a table showing a syntax structure for a coding unit according to a prior approach.

FIG. 18 is a table showing a new syntax structure for a coding unit that can be encoded as an intra-BC-predicted block in skip mode.

FIG. 20 is a table illustrating hash values for candidate blocks in hash-based block matching.

FIGS. 21a-21c are tables illustrating example data structures that organize candidate blocks for hash-based block matching.

FIGS. 22a-22c are tables illustrating example data structures that organize candidate blocks for iterative hash-based block matching.

FIG. 25 is a flowchart illustrating a technique for deciding whether to use block flipping during encoding.

FIG. 26 is a flowchart illustrating a technique for deciding whether a block should be encoded in intra-BC-predicted skip mode during encoding.

DETAILED DESCRIPTION

The detailed description presents innovations in the area of encoding blocks using prediction. For example, some of the innovations relate to encoder-side decisions about when to use block flipping during prediction. Other innovations relate to encoder-side decisions about when to use skip mode for a block predicted using intra block copy ("BC") prediction. In many situations, the innovations improve coding efficiency.

Although operations described herein are in places described as being performed by a video encoder or decoder, in many cases the operations can be performed by another type of media processing tool (e.g., image encoder or decoder).

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014. The innovations described herein can also be implemented for other standards or formats.

Some of the innovations described herein (e.g., block flipping) are described with reference to intra BC prediction. The innovations can also be applied in other contexts (e.g., block flipping for reference regions in motion compensation).

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
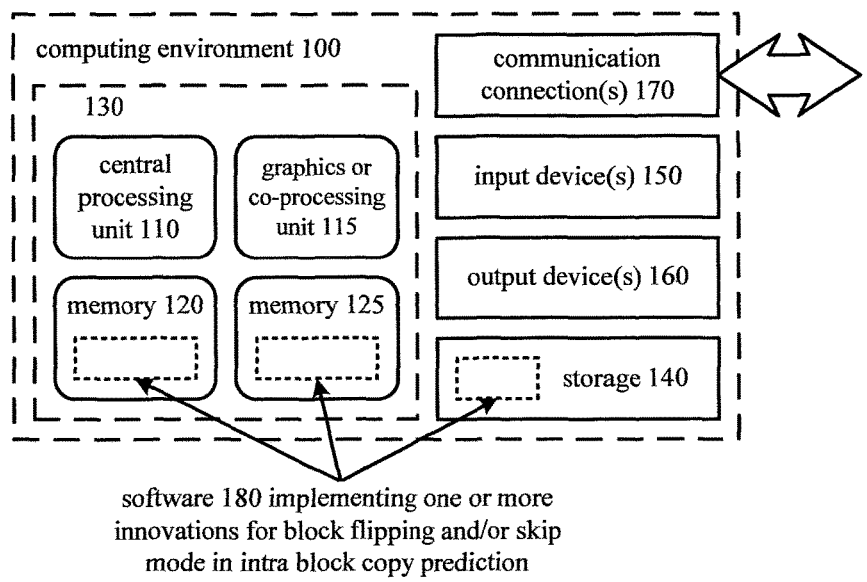
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoder-side decisions for block flipping and/or skip mode in intra BC prediction, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for encoder-side decisions for block flipping and/or skip mode in intra BC prediction.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
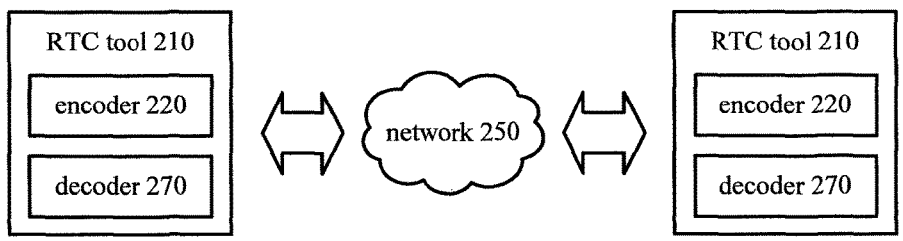
FIGS. 2a and 2b are diagrams of example network environments in which some described embodiments can be implemented.
Figure 2B:
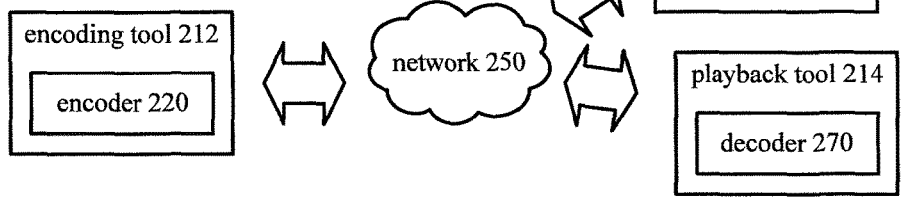

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2a includes two real-time communication tools (210), the network environment (201) can instead include three or more real-time communication tools (210) that participate in multi-party communication.

Figure 3:
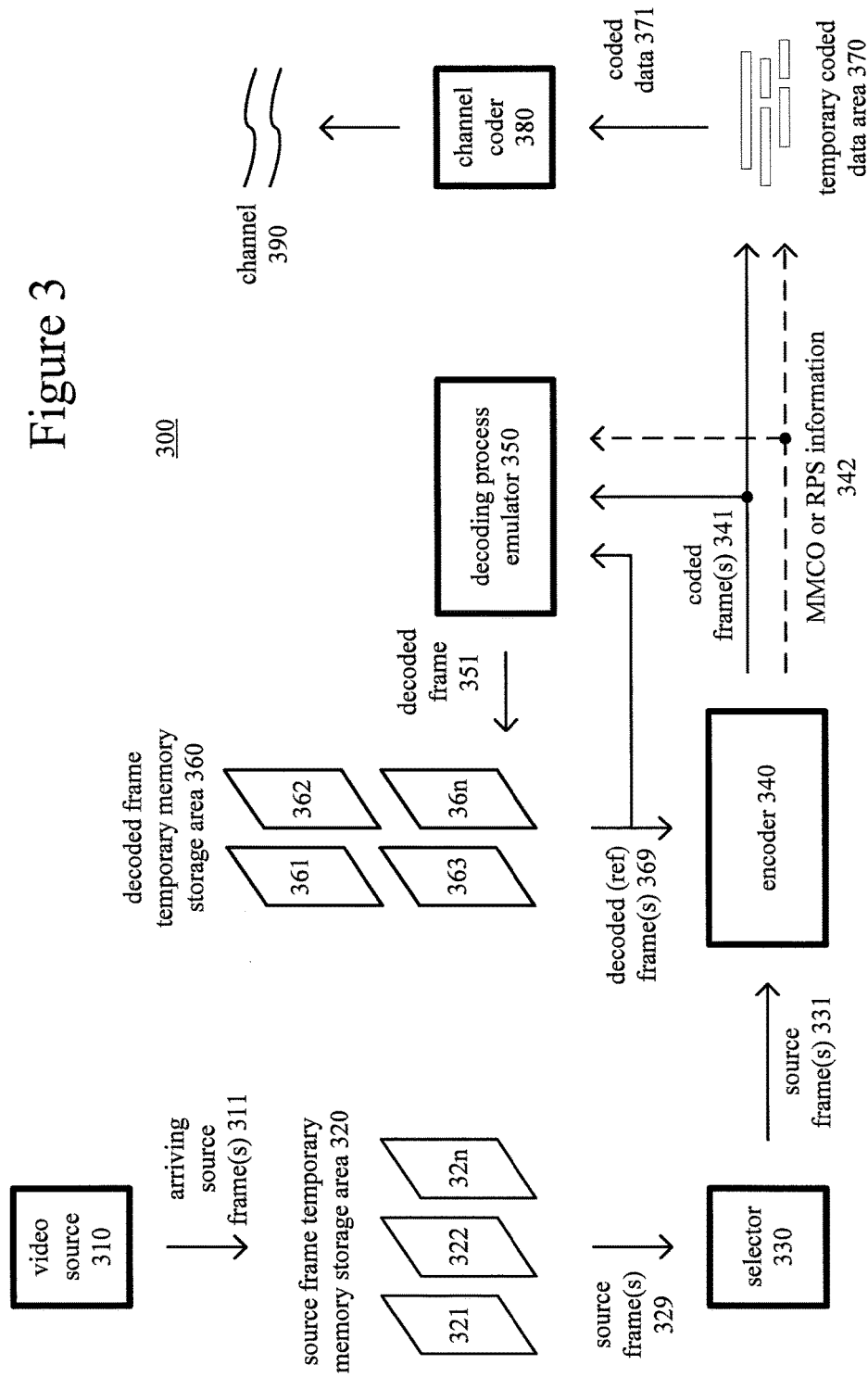
FIG. 3 is a diagram of an example encoder system in conjunction with which some described embodiments can be implemented.
Figure 4:
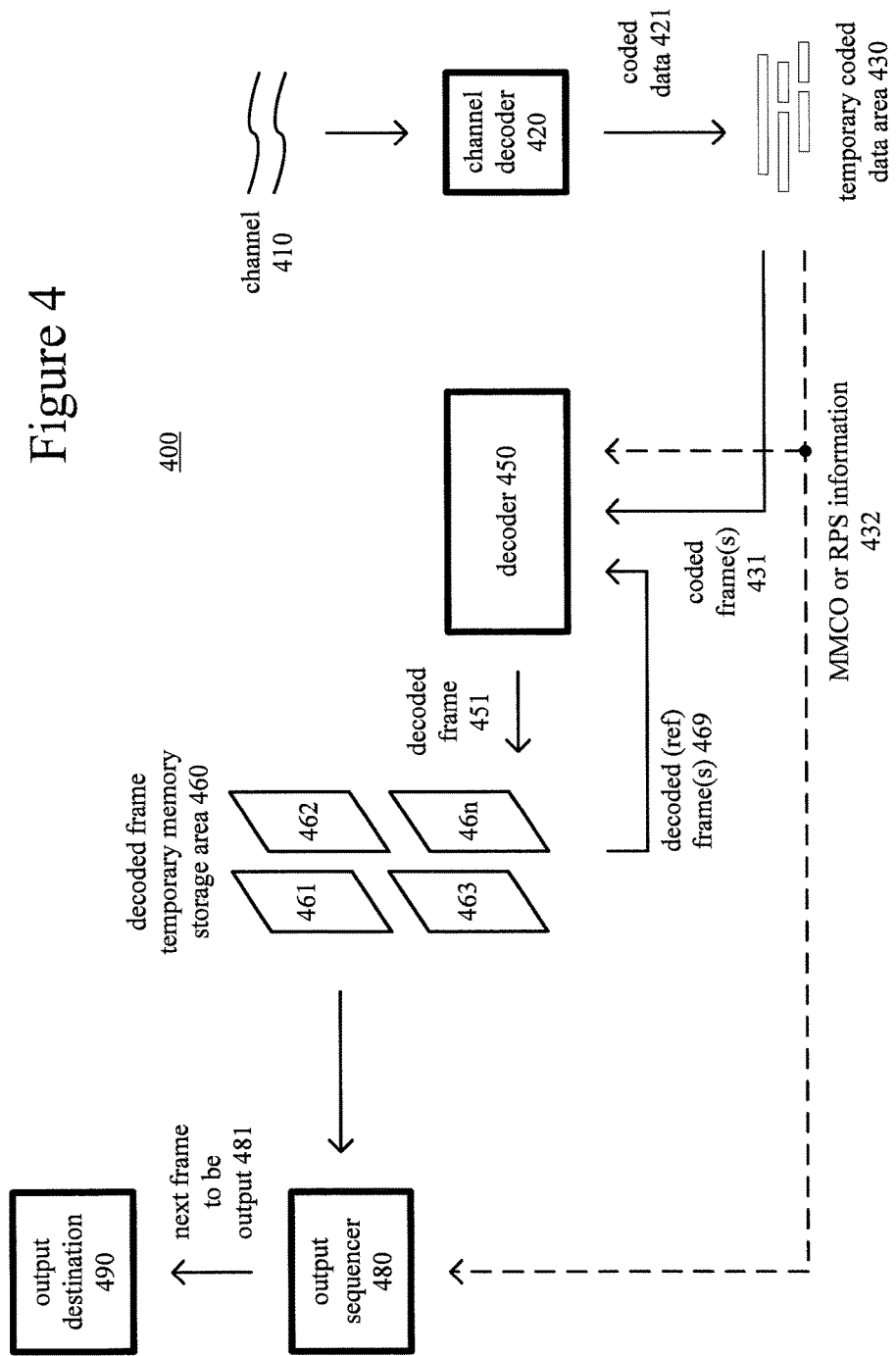
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using block flipping and/or skip mode in intra BC prediction, as described herein.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values (or, in some implementations, with respect to original sample values in the frame (331)). An intra-frame prediction reference region is a region of samples in the frame that are used to generate BC-prediction values for the block. The reference region can be indicated with a block vector ("BV") value (determined in BV estimation). The reference region can be flipped relative to the prediction region for the block, as described herein. For intra spatial prediction for a block, the intra-picture estimator estimates extrapolation of the neighboring reconstructed sample values into the block. The intra-picture estimator can output prediction information (such as BV values for intra BC prediction or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples in a current frame. The reference region can be flipped relative to the prediction region for the block, as described herein. The motion estimator outputs motion information such as motion vector ("MV") information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, index values for BV predictors, BV differentials, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, ..., 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be adapted for decoding of a particular type of content (e.g., screen capture content). The decoder system (400) can be implemented as an operating system module, as part of an application library or as a standalone application. Overall, the decoder system (400) receives coded data from a channel (410) and produces reconstructed frames as output for an output destination (490). The coded data can include content that has been encoded using block flipping and/or skip mode in intra BC prediction, as described herein.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An inter-frame reference region can be flipped relative to the prediction region for a block, as described herein. An intra-frame prediction module can spatially predict sample values of a current block from neighboring, previously reconstructed sample values or, for intra BC prediction, predict sample values of a current block using previously reconstructed sample values of an intra-frame prediction region in the frame. The intra-frame reference region can be indicated with a BV value. The reference region can be flipped relative to the prediction region for a block, as described herein. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
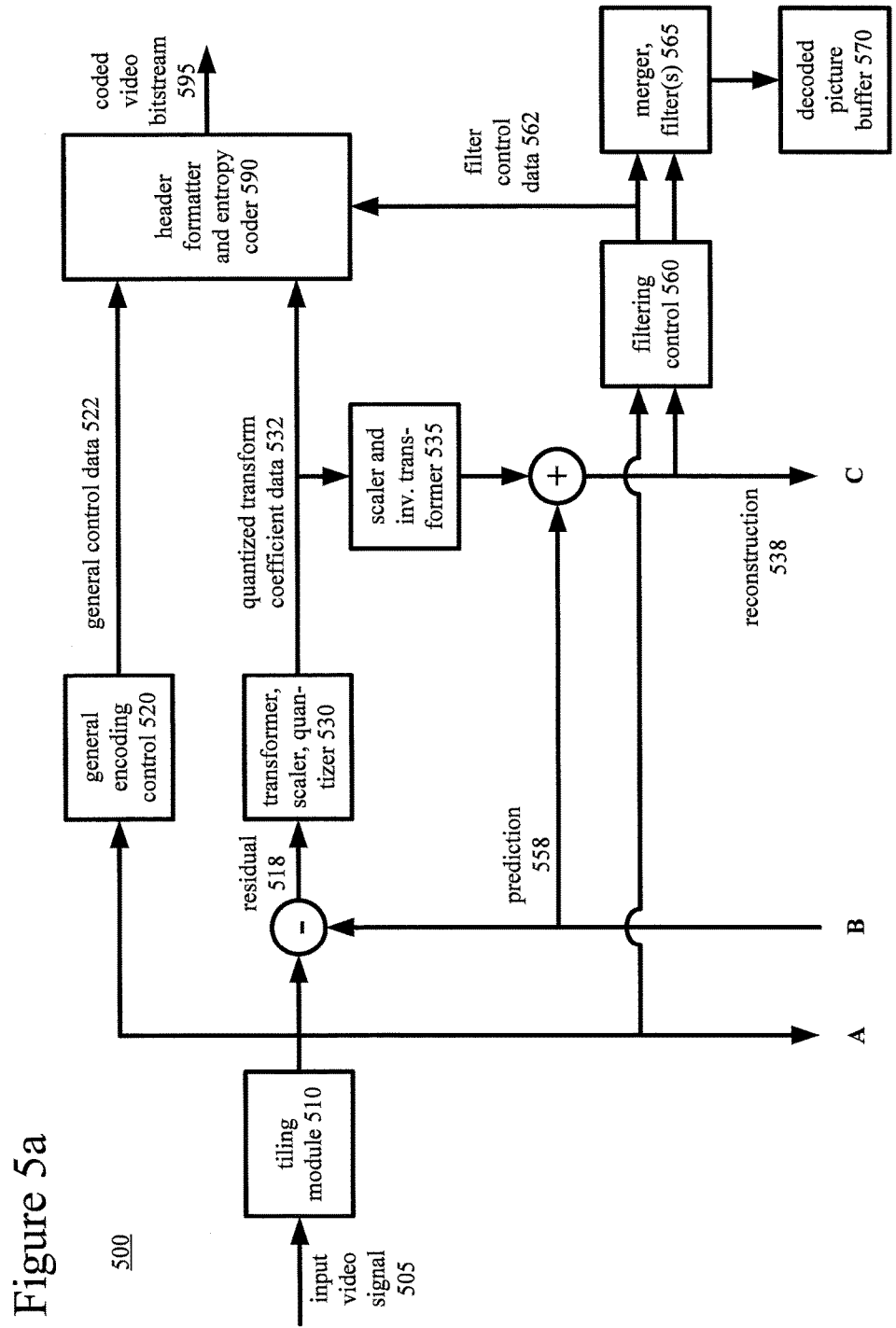
FIGS. 5a and 5b are diagrams illustrating an example video encoder in conjunction with which some described embodiments can be implemented.
Figure 5B:
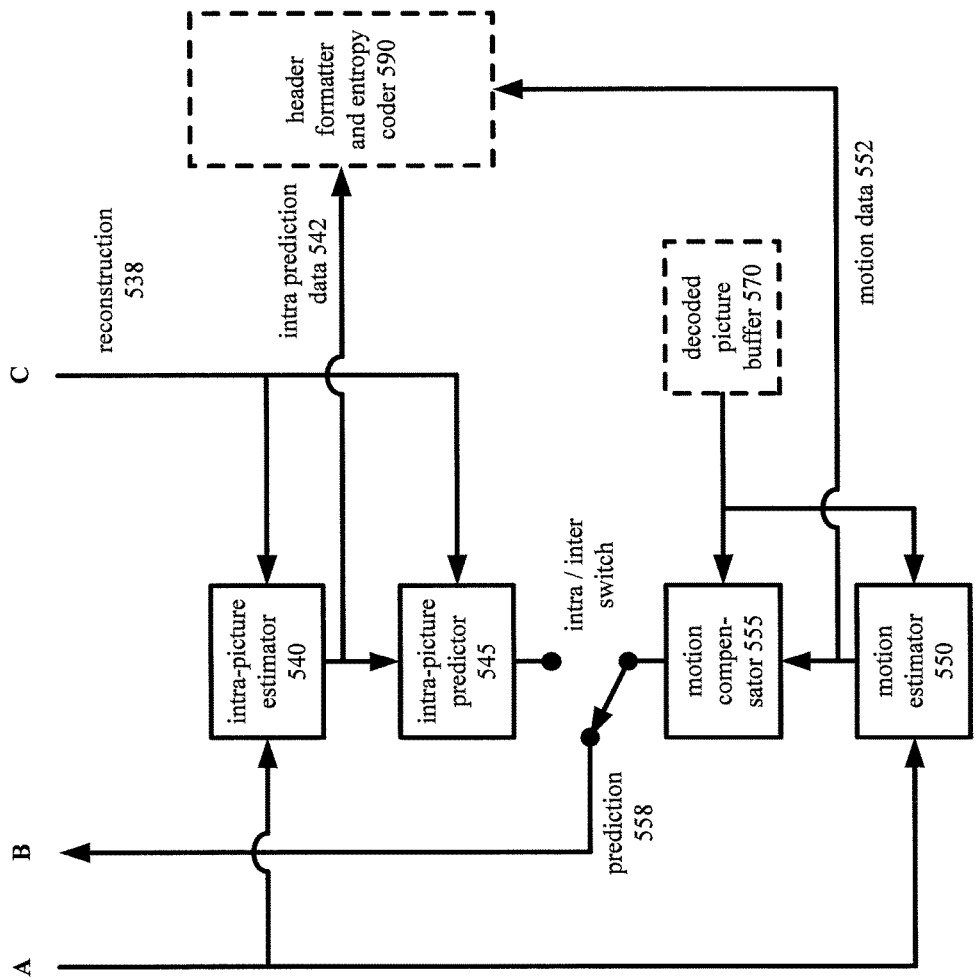

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use aspects of intra BC prediction (e.g., skip mode, block flipping) during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions.

The general control data (522) is provided to the header formatter/entropy coder (590).

If the current picture is predicted using inter-picture prediction, a motion estimator (550) estimates the motion of blocks of sample values in the current picture of the input video signal (505) with respect to one or more reference pictures. The motion estimator (550) can evaluate options for flipping a given reference region for an inter-picture coded block, as described below. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, reference picture selection data and whether block flipping is used. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture. When block flipping is used, the motion compensator (555) can account for flipping for a prediction region (for a current block) relative to its reference region, as described below.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block in the current picture from neighboring, previously reconstructed sample values of the current picture. Or, for intra BC prediction using BV values, the intra-picture estimator (540) estimates displacement of the sample values of the current block to different candidate reference regions within the current picture. The candidate reference regions can include reconstructed sample values or, in some implementations for purposes of BV estimation, original sample values from the input video. The intra-picture estimator (540) can evaluate different options for flipping of an intra BC prediction region (for a current block) relative to the respective candidate reference regions, as described below.

The intra-picture estimator (540) produces as side information intra prediction data (542), such as information indicating whether intra prediction uses spatial prediction or intra BC prediction, prediction mode direction (for intra spatial prediction), BV values (for intra BC prediction) and whether block flipping is used (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block in the current picture from neighboring, previously reconstructed sample values of the current picture. Or, for intra BC prediction, the intra-picture predictor (545) predicts the sample values of the current block using previously reconstructed sample values of an intra-frame prediction reference region, which is indicated by a BV value for the current block. For intra BC prediction, the intra-picture predictor (545) can account for flipping for an intra BC prediction region (for a current block) relative to its reference region, as described below. In some cases, the BV value can be a BV predictor (predicted BV value). In other cases, the BV value can be different than its predicted BV value. When the chroma data for a picture has the same resolution as the luma data (e.g. when the format is YUV 4:4:4 format or RGB 4:4:4 format), the BV value that is applied for the chroma block may be the same as the BV value applied for the luma block. On the other hand, when the chroma data for a picture has reduced resolution relative to the luma data (e.g. when the format is YUV 4:2:0 format), the BV value that is applied for the chroma block may be scaled down and possibly rounded to adjust for the difference in chroma resolution (e.g. by dividing the vertical and horizontal components of the BV value by two and truncating or rounding them to integer values).

The intra/inter switch selects whether the prediction (558) for a given block will be a motion-compensated prediction or intra-picture prediction. The difference (if any) between a block of the prediction (558) and a corresponding part of the original current picture of the input video signal (505) provides values of the residual (518), for a non-skip-mode block. During reconstruction of the current picture, for a non-skip-mode block, reconstructed residual values are combined with the prediction (558) to produce an approximate or exact reconstruction (538) of the original content from the video signal (505). (In lossy compression, some information is lost from the video signal (505).)

In the transformer/scaler/quantizer (530), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. For a non-skip-mode block, the encoder (500) combines reconstructed residual values with values of the prediction (558) (e.g., motion-compensated prediction values, intra-picture prediction values) to form the reconstruction (538). For a skip-mode block, the encoder (500) uses the values of the prediction (558) as the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For the intra prediction data (542), the header formatter/entropy coder (590) can select and entropy code BV predictor index values (for intra BC prediction). The header formatter/entropy coder (590) can also entropy code syntax elements indicating whether block flipping is used for intra BC prediction (or motion compensation). In some cases, the header formatter/entropy coder (590) also determines BV differentials for BV values (relative to BV predictors for the BV values), then entropy codes the BV differentials, e.g., using context-adaptive binary arithmetic coding. In particular, for a skip-mode intra-BC-predicted block, the BV differential is signaled.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
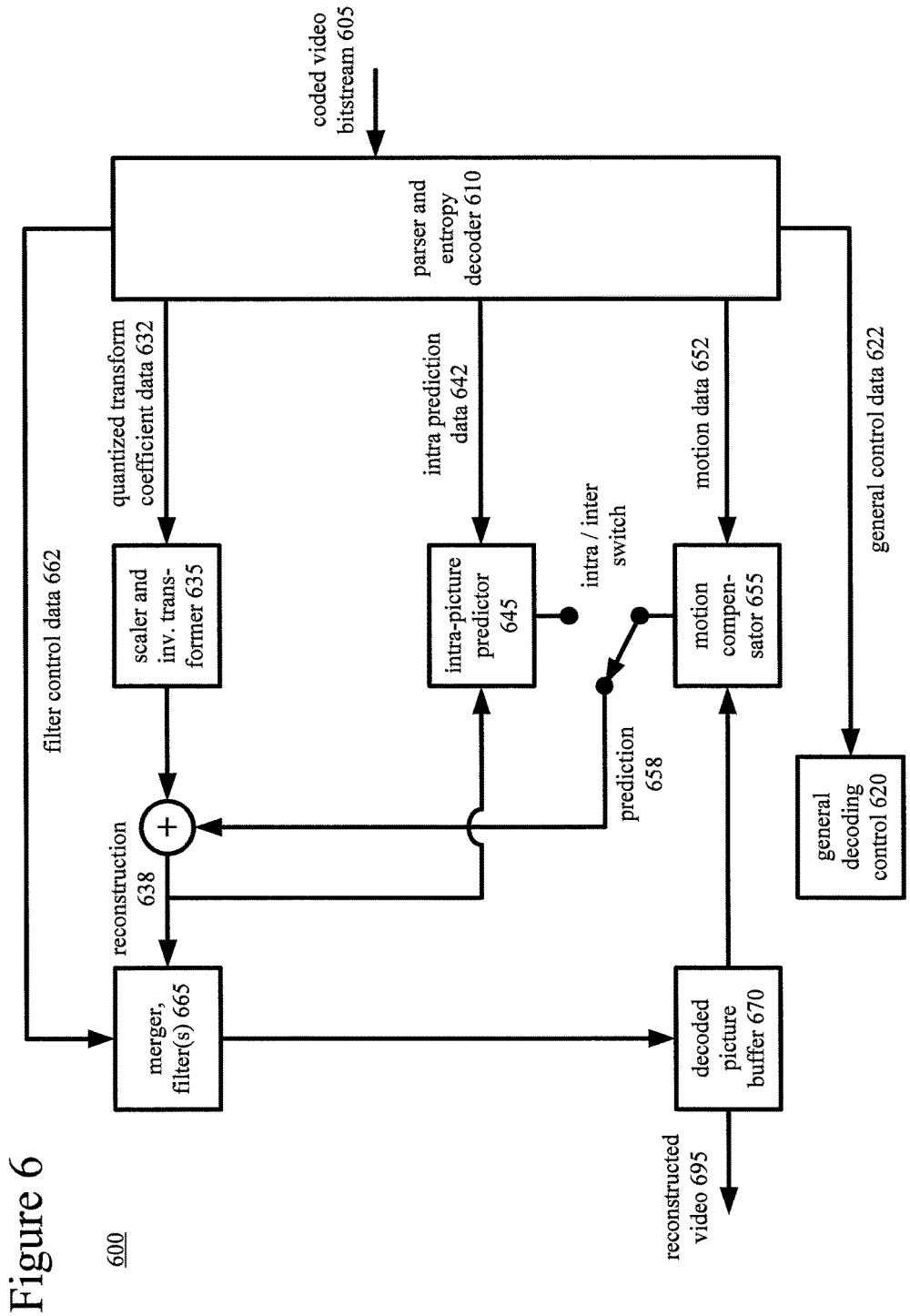
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). For the intra prediction data (642), the parser/entropy decoder (610) entropy decodes BV predictor index values (for intra BC prediction). The parser/entropy decoder (610) also entropy decodes syntax elements indicating whether block flipping is used for intra BC prediction (or motion compensation). In some cases, the parser/entropy decoder (610) also entropy decodes BV differentials for BV values (e.g., using context-adaptive binary arithmetic decoding), then combines the BV differentials with corresponding BV predictors to reconstruct the BV values. In particular, for a skip-mode intra-BC-predicted block, a BV differential is parsed from the bitstream and combined with a BV predictor (e.g., indicated with the BV predictor index value) to reconstruct a BV value.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data, merge mode index values and syntax elements indicating whether block flipping is used (for motion compensation). The motion compensator (655) applies MVs to the reconstructed reference picture(s) from the decoded picture buffer (670). When block flipping is used, the motion compensator (655) can account for flipping for a prediction region (for a current block) relative to its reference region, as described below. The motion compensator (655) produces motion-compensated predictions for inter-coded blocks in the current picture. The decoded picture buffer (670) stores one or more previously reconstructed pictures for use as reference pictures.

In a separate path within the decoder (600), the intra-frame prediction predictor (645) receives the intra prediction data (642), such as information indicating whether intra prediction uses spatial prediction or intra BC prediction, prediction mode direction (for intra spatial prediction), BV values (for intra BC prediction) and syntax elements indicating whether block flipping is used (for intra BC prediction). For intra spatial prediction, using values of a reconstruction (638) of the current picture, according to prediction mode data, the intra-picture predictor (645) spatially predicts sample values of a current block in the current picture from neighboring, previously reconstructed sample values of the current picture. Or, for intra BC prediction using BV values, the intra-picture predictor (645) predicts the sample values of the current block using previously reconstructed sample values of an intra-frame prediction reference region, which is indicated by a BV value for the current block. For intra BC prediction, the intra-picture predictor (645) can account for flipping for an intra BC prediction region (for a current block) relative to its reference region, as described below.

The intra/inter switch selects whether the prediction (658) for a given block is a motion-compensated prediction or intra-picture prediction. For example, when H.265/HEVC syntax is followed, the intra/inter switch can be controlled based on one or more syntax elements encoded for a CU in a picture that can contain intra-predicted CUs and inter-predicted CUs. For a non-skip-mode block, the decoder (600) combines the prediction (658) with reconstructed residual values to produce the reconstruction (638) of the content from the video signal. For a skip-mode block, the decoder (600) uses the values of the prediction (658) as the reconstruction (638).

To reconstruct the residual for a non-skip-mode block, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter (608) can include de-ringing filtering, adaptive Wiener filtering, film-grain reproduction filtering, SAO filtering or another kind of filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Innovations in Intra Block Copy Prediction.

This section presents features of intra block copy ("BC") prediction. For example, some of the features relate to block flipping in which an intra BC prediction region is flipped relative to a reference region, which can be indicated by a block vector ("BV") value. Other features relate to signaling of a skip mode in which a current intra-BC-predicted block uses a signaled BV differential but lacks residual data. In many situations, these features improve coding efficiency for intra-BC-predicted blocks.

In particular, the described innovations can improve rate-distortion performance when encoding certain "artificially" created video content such as screen-capture content. Screen-capture content typically includes repeated structures (e.g., graphics, text characters), which provide opportunities for intra BC prediction to improve performance. Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen-capture content include remote desktop conferencing and encoding/decoding of graphical overlays on natural video or other "mixed content" video.

A. Intra BC Prediction Mode, BV Values and BV Prediction—Introduction.

For intra BC prediction, the sample values of a current block in a picture are predicted using sample values in the same picture. A BV value indicates a displacement from the current block to a region in the picture (the "reference region") that includes the sample values used for prediction. The reference region provides predicted values (an "intra BC prediction region") for the current block. The sample values used for prediction are previously reconstructed sample values, which are thus available at the encoder during encoding and at the decoder during decoding. The BV value can be signaled in the bitstream, and a decoder can use the BV value to determine the reference region (which has been reconstructed at the decoder) in the picture to use for prediction. Intra BC prediction is a form of intra-picture prediction-intra BC prediction for a block in a picture does not use any sample values other than sample values in the same picture.

Figure 7A:
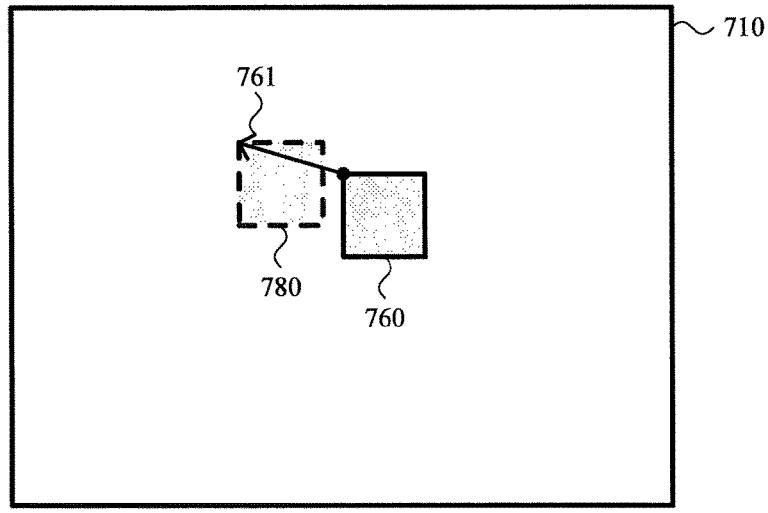
FIGS. 7a and 7b are diagrams illustrating intra BC prediction for a block in a picture and BV prediction for the block, respectively.

FIG. 7a illustrates intra BC prediction for a current block (760) in a current frame (710). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m x n, where each of m and n is a whole number, and where m and n can be equal to each other or can have different values. Alternatively, the current block can have some other shape (e.g., an area of a coded video object with a non-rectangular shape).

The BV (761) indicates a displacement (or offset) from the current block (760) to a reference region (780) in the picture that includes the sample values used for prediction. The reference region (780) indicated by the BV (761) is sometimes termed the "matching block" for the current block (760). The matching block can be identical to the current block (760), or it can be an approximation of the current block (760). Suppose the top left position of a current block is at position $(x_0, y_0)$ in the current frame, and suppose the top left position of the reference region is at position $(x_1, y_1)$ in the current frame. The BV indicates the displacement $(x_1-x_0, y_1-y_0)$. For example, if the top left position of the current block is at position (256, 128), and the top left position of the reference region is at position (176, 104), the BV value is (−80, −24). In this example, a negative horizontal displacement indicates a position to the left of the current block, and a negative vertical displacement indicates a position above the current block.

Intra BC prediction can improve coding efficiency by exploiting redundancy (such as repeated patterns inside a frame) using BC operations. The sample values of a current block are represented using a BV value instead of directly encoding the sample values of the current block. Even if the sample values of the current block do not exactly match the sample values of the reference region indicated with the BV value, the differences may be negligible (not perceptually noticeable). Or, if the differences are significant, the differences may be encoded as residual values that can be compressed more efficiently than the original sample values for the current block.

Collectively, BV values for blocks encoded using intra BC prediction can consume a significant number of bits. The BV values can be entropy encoded to reduce bit rate. To further reduce bit rate for BV values, an encoder can use prediction of the BV values. BV values often exhibit redundancy—the BV value for a given block is often similar to, or even the same as, the BV values of previous blocks in the picture. For BV prediction, the BV value for the given block is predicted using a BV predictor. The difference (or BV differential) between the BV value for the given block and the BV predictor is then entropy coded. Typically, the BV differential is computed for horizontal and vertical components of the BV value and BV predictor. When BV prediction works well, BV differentials have a probability distribution that supports efficient entropy coding. In one draft version of the H.265/HEVC standard (JCTVC-P1005), the BV predictor is the BV value of the last coded CU within the current CTU (that is, the BV value of the previous intra-BC-predicted block within the current CTU). Alternatively, the BV predictor is selected from among multiple available BV values (e.g., in a neighborhood around the current block).

Figure 7B:
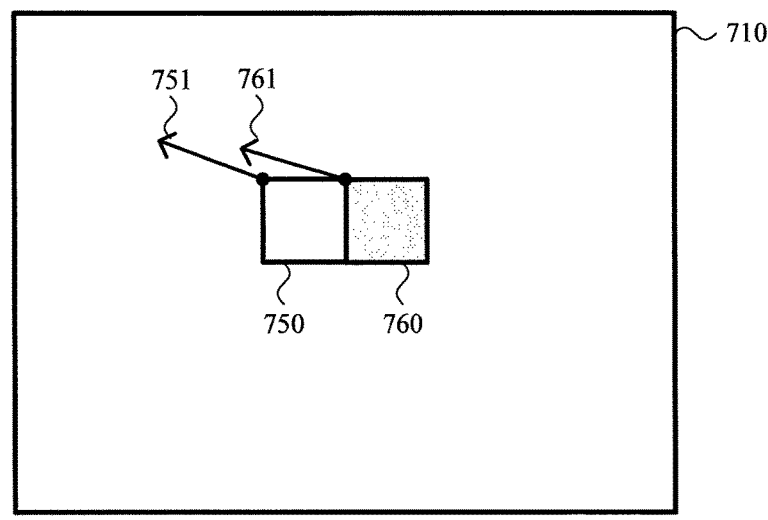

FIG. 7b shows a BV (761) of a current block (760) in a frame as well as a BV (751) of a previous block (750) in the frame (710). The BV (751) of the previous block (750) is used as the BV predictor for the BV (761) of the current block (760). For example, if the BV value is (−80, −24) and the BV predictor is (−80, −32), the BV differential of (0, 8) is entropy encoded.

A decoder receives and entropy decodes the entropy coded BV differential for a BV value. The decoder also determines a BV predictor for the BV value. The BV predictor determined by the decoder is the same as the BV predictor determined by the encoder. The decoder combines the BV predictor and decoded BV differential to reconstruct the BV value.

B. Block Flipping in Intra BC Prediction.

In previous approaches to intra BC prediction, the reference region indicated by a BV value provides the intra BC prediction region for a current block. That is, the sample values of the reference region are the intra BC predicted values for the current block.

According to one aspect of the innovations described herein, an intra BC prediction region for a current block is flipped relative to a reference region. A BV value for the current block can indicate the reference region. Instead of using the reference region directly as the intra BC prediction region for the current block, the reference region can be flipped horizontally and/or vertically. In particular, block flipping can improve coding efficiency for text characters of screen capture content.

1. Examples of Block Flipping.

FIGS. 8a-8d, 9a-9c and 10a-10c illustrate examples of block flipping in intra BC prediction.

Figure 8A:
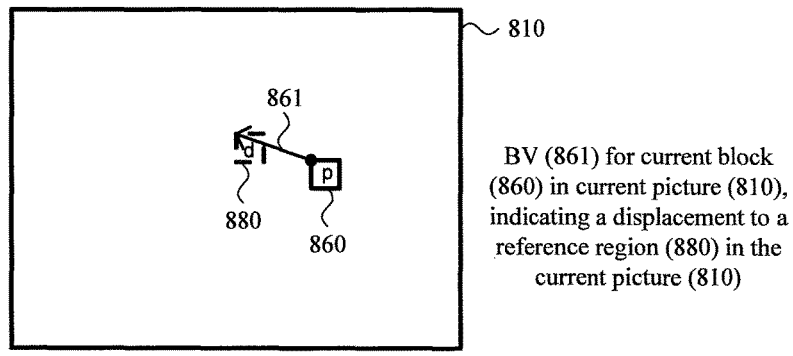
Figure 8B:
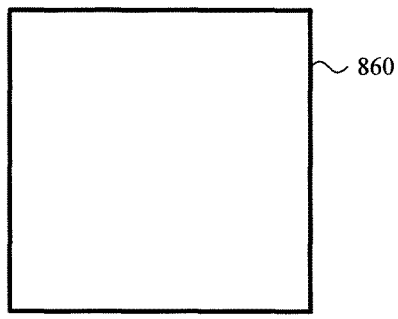
Figure 8C:
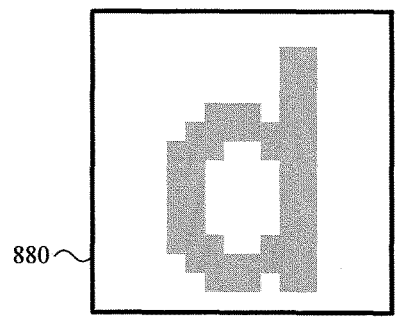
Figure 8D:
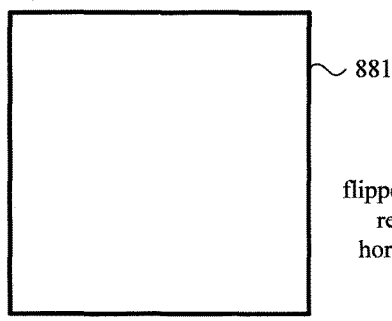

FIG. 8a shows a current block (860) in a current picture (810). The current block (860) includes the text character p, as detailed in FIG. 8b. A BV (861) for the current block (860) indicates a displacement to a reference region (880) in the current picture (810). The reference region (880) includes the text character d, as detailed in FIG. 8c. Without flipping, the reference region (880) is a poor predictor for the current block (860). (The sample-by-sample differences between the current block (860) and reference region (880) are significant.)

An encoder and decoder can use block flipping in intra BC prediction to improve coding efficiency. For example, the reference region (880) can be flipped horizontally and vertically, as shown in the flipped reference region (881) of FIG. 8d. In this example, when the reference region (880) is flipped horizontally and vertically, the flipped reference region (881) exactly matches the current block (860). (That is, the intra BC prediction region is perfect for the current block (880), and the residual includes only zero-value samples.)

Similarly, the reference region (880) can be flipped horizontally. For example, if a given block included the text character b, horizontal flipping of the reference region (880) could yield a flipped reference region that exactly matches the given block. Or, the reference region (880) can be flipped vertically. For example, if a given block included the text character q, vertical flipping of the reference region (880) could yield a flipped reference region that exactly matches the given block.

With block flipping, for many fonts, a block that includes a text character in a set of text characters (e.g., the set b, d, p and q, or the set u and n) can be predicted exactly from a reference region that includes another text character in the same set of text characters. For other fonts, a block that includes a text character in a set of text characters can be predicted approximately from a reference region that includes another text character in the same set of text characters. More generally, block flipping can improve coding efficiency for various alphabets of text characters or other patterns in screen content.

Thus, with block flipping, a block that includes a text character (or other pattern) can be intra BC predicted even if the text character (or other pattern) has not previously appeared in a picture, which may improve coding efficiency compared to other methods of encoding the block. Or, even if the text character (or other pattern) has previously appeared in the picture, intra BC prediction can use a flipped reference region that is closer to the block than a reference region with the identical text character (or other pattern). The BV value for the closer, flipped region might be encoded much more efficiently than the BV value for the more distant reference region. For example, for a current block that includes the text character q, suppose a first candidate reference region that includes the same character q can be indicated with BV value (−280, −24), while a second candidate reference region that includes the different character p can be indicated with BV value (−32, 0). The second candidate reference region can be flipped horizontally to exactly match the current block. The BV value for the second candidate reference region can be encoded more efficiently (fewer bits) than the BV value for the first candidate reference region, even accounting for signaling of syntax elements to indicate the block flipping.

As shown in FIGS. 9a-9c, blocks and reference regions can include multiple text characters. FIG. 9a shows a current block (960) that includes the text characters dl. A BV value for the current block (960) indicates a displacement to a reference region (980) in the same picture. The reference region (980) includes the text characters 1b, as detailed in FIG. 9b. Without flipping, the reference region (980) is a poor predictor for the current block (960). If the reference region (980) is flipped horizontally, however, the flipped reference region (981) exactly matches the current block (960).

In the foregoing examples, the blocks and reference regions include entire text characters. As shown in FIGS. 10a-10c, blocks and reference regions can instead include one or more parts of a text character, symbol or pattern. FIG. 10a shows a current block (1060) that includes part of the text character L. A BV value for the current block (1060) indicates a displacement to a reference region (1080) in same picture. The reference region (1080) includes part of the text character F, as detailed in FIG. 10b. Without flipping, the reference region (1080) is a poor predictor for the current block (1060). If the reference region (1080) is flipped vertically, however, the flipped reference region (1081) exactly matches the current block (1060).

2. Example Flipping Operations.

When block flipping is used in intra BC prediction, the intra BC prediction region for a block is flipped relative to the reference region for the block. Block flipping operations can be implemented in various ways, depending on implementation.

According to one approach to performing block flipping operations, when determining the intra BC prediction region for a current block, an encoder or decoder (a) determines the reference region, (b) flips the reference region, and then (c) assigns sample values at respective positions of the flipped reference region to sample values at the respective positions of the intra BC prediction region. For example, for a 16×16 block, the encoder or decoder determines a 16×16 reference region indicated by a BV value for the block, then flips the 16×16 reference region horizontally and/or vertically. This involves creating a copy of the 16×16 reference region, which has been flipped. Then, sample values at positions of the flipped reference region are assigned to sample values at the same positions of the intra BC prediction region (e.g., the sample value at position (0, 0) of the flipped reference region is assigned to the sample value at position (0, 0) of the intra BC prediction region, the sample value at position (0, 1) of the flipped reference region is assigned to the sample value at position (0, 1) of the intra BC prediction region, and so on).

According to another approach to performing block flipping operations, when determining the intra BC prediction region for a current block, an encoder or decoder (a) determines the reference region, (b) assigns sample values at respective positions of the reference region to sample values at the respective positions of the intra BC prediction region, and then (c) flips the intra BC prediction region. For example, for a 16×16 block, the encoder or decoder determines a 16×16 reference region indicated by a BV value for the block. Sample values at positions of the reference region are assigned to sample values at the same positions of the intra BC prediction region (e.g., the sample value at position (0, 0) of the reference region is assigned to the sample value at position (0, 0) of the intra BC prediction region, the sample value at position (0, 1) of the reference region is assigned to the sample value at position (0, 1) of the intra BC prediction region, and so on). Then, the encoder or decoder flips the 16×16 intra BC prediction horizontally and/or vertically. This involves creating a copy of the 16×16 intra BC prediction, which has been flipped.

According to a third approach to performing block flipping operations, an encoder and decoder avoid creating an intermediate copy of the reference region or intra BC prediction region. When determining the intra BC prediction region for a current block, an encoder or decoder (a) determines the reference region, and then (b) assigns sample values at respective positions of the reference region to sample values at corresponding positions of the intra BC prediction region, where the corresponding positions account for block flipping. When horizontal flipping is used, the first column of the reference region provides the last column of the intra BC prediction region, the second column of the reference region provides the second-to-last column of the intra BC prediction region, and so on. When vertical flipping is used, the first row of the reference region provides the last row of the intra BC prediction region, the second row of the reference region provides the second-to-last row of the intra BC prediction region, and so on. When horizontal and vertical flipping are used together, the positions of the reference region can be traversed in reverse order horizontally and vertically when assigning sample values to the positions of the intra BC prediction region. For example, for a 16×16 block, the encoder or decoder determines a 16×16 reference region indicated by a BV value for the block. Sample values at positions of the reference region are assigned to sample values at corresponding positions of the intra BC prediction region in reverse order horizontally and/or vertically (e.g., the sample value at position (0, 0) of the reference region is assigned to the sample value at position (15, 15) of the intra BC prediction region, the sample value at position (0, 1) of the reference region is assigned to the sample value at position (15, 14) of the intra BC prediction region, and so on).

3. Example Signaling for Block Flipping.

When block flipping is enabled for intra BC prediction, the decision to use or not use block flipping can be signaled in various ways, depending on implementation.

Block flipping can be enabled for a sequence, picture or other unit of video. A sequence-layer syntax element (e.g., in an SPS), picture-layer syntax element (e.g., in a PPS) or slice-header layer syntax element (e.g., in a slice segment header) can indicate whether block flipping is enabled or disabled. Or, block flipping can be enabled for some profiles or levels of encoding and decoding. The decision to enable block flipping can be made on a direction-by-direction basis (e.g., horizontal block flipping only, vertical block flipping only, or both horizontal and vertical block flipping). If block flipping is enabled, additional syntax elements signal when and how block flipping is used.

When only vertical flipping is enabled, a flag value can indicate whether or not vertical flipping is used during intra BC prediction. When only horizontal flipping is enabled, a flag value can indicate whether or not horizontal flipping is used during intra BC prediction. When both vertical flipping and horizontal flipping are enabled, two flag values can indicate whether or not flipping is used during intra BC prediction for horizontal and vertical flipping, with each flag indicating a decision for a direction of flipping. Or, a single syntax element with multiple values can be used (e.g., with possible values indicating vertical flipping only, horizontal flipping only, both horizontal and vertical flipping, or no flipping).

Syntax elements (e.g., flag values) that indicate whether block flipping is used for a current block can be signaled in the bitstream along with other syntax elements for the current block. For example, the syntax element(s) about block flipping for a PU are signaled for the PU. Or, the syntax elements that indicate whether block flipping is used for a current block can be signaled in the bitstream for a larger block that includes the current block. For example, the syntax element(s) about block flipping for one or more PUs are signaled for the CU that includes the PU(s). Alternatively, syntax elements that indicate whether block flipping is used for a current block are signaled at some other level in the bitstream.

The syntax elements that indicate whether block flipping is used for a current block can be entropy coded. For example, the flag value for a current block is encoded using context-adaptive binary arithmetic coding and decoded using context-adaptive binary arithmetic decoding. Alternatively, a different form of entropy coding can be used, or the syntax elements can be signaled as fixed-length values.

The syntax element(s) that indicate whether block flipping is used for a current block can be separately and conditionally signaled in the bitstream. For example, a flag value that indicates whether block flipping is used or not used can be signaled if the current block is intra BC predicted, but not signaled if the current block is not intra BC predicted. Or, syntax element(s) that indicate whether block flipping is used for a current block can be jointly coded with another syntax element in the bitstream. For example, a flag value that indicates whether block flipping is used or not used can be jointly coded with a flag value indicating whether the current block is intra BC predicted.

4. Examples of Block Flipping in Hash-Based Block Reconstruction.

Instead of sending a BV value that indicates the reference region, an encoder can signal a hash value that indicates the reference region. Specifically, the hash value indicates an entry in a block hash dictionary constructed at the encoder. Example approaches to constructing and using a block hash dictionary at an encoder are described in JCTVC-O0357, entitled "Screen Content Coding Using 2-D Dictionary Mode." Other example approaches to constructing and using a block hash dictionary are described in section VIII. When the decoder also has a block hash dictionary, the encoder determines hash values for possible reference regions using reconstructed sample values of a current picture, and organizes the possible reference regions according to hash value in its block hash dictionary. A decoder, using the signaled hash value, determines the reference region in its own block hash dictionary, which organizes possible reference regions according to hash value. The decoder constructs its block hash dictionary using the same approach as the encoder, from reconstructed sample values of the current picture. Thus, the block hash dictionary is the same at the encoder and the decoder.

The hash value that indicates a reference region in a block hash dictionary can be separate from the indication (e.g., syntax elements) of whether the intra BC prediction region is flipped relative to the reference region. In this case, the decoder determines the reference region from its block hash dictionary using the hash value, then accounts for flipping of the reference region. Alternatively, the hash value can directly indicate a flipped reference region in a block hash dictionary, where the encoder and decoder have flipped the possible reference regions and computed hash values for possible flipped reference regions for their respective block hash dictionaries. In this case, the decoder determines the flipped reference region from the block hash dictionary using the signaled hash value; the hash value itself provides the indication whether the intra BC prediction region is flipped relative to the reference region.

5. Example Encoding with Block Flipping in Intra BC Prediction.

Figure 11:
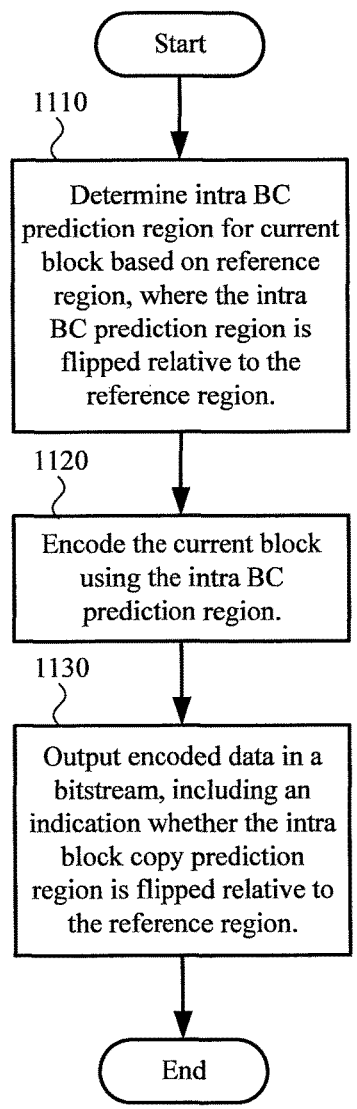
FIGS. 11 and 12 are flowcharts illustrating techniques for encoding and decoding, respectively, in which an intra BC prediction region is flipped relative to a reference region.

FIG. 11 shows an example technique (1100) for block flipping in intra BC prediction during encoding. An image encoder or video encoder such as one described with reference to FIG. 3 or FIGS. 5a-5b can perform the technique (1100).

The encoder determines (1110) an intra BC prediction region for a current block in a picture based on a reference region in the picture. The current block can be a PU, CU or other block. A BV value for the current block, identified in BV estimation, can indicate a displacement to the reference region in the picture. Alternatively, a hash value for the current block can indicate the reference region in a block hash dictionary. The intra BC prediction region is flipped relative to the reference region. For example, the intra BC prediction region is flipped horizontally and/or vertically relative to the reference region. Examples of approaches to performing block flipping operations are described above (see section VII.B.2).

The encoder encodes (1120) the current block using the intra BC prediction region and outputs (1130) encoded data in a bitstream. The encoded data includes an indication whether the intra BC prediction region is flipped relative to the reference region. For example, the indication is one or more syntax elements in the bitstream. Examples of approaches to signaling whether block flipping is used are described above (see section VII.B.3).

The encoder can similarly encode other intra-BC-predicted blocks on a block-by-block basis for a slice, tile or picture, with or without block flipping. Section VIII describes example approaches that an encoder can follow when making decisions about whether to use block flipping during prediction (e.g., intra BC prediction).

6. Example Decoding with Block Flipping in Intra BC Prediction.

Figure 12:
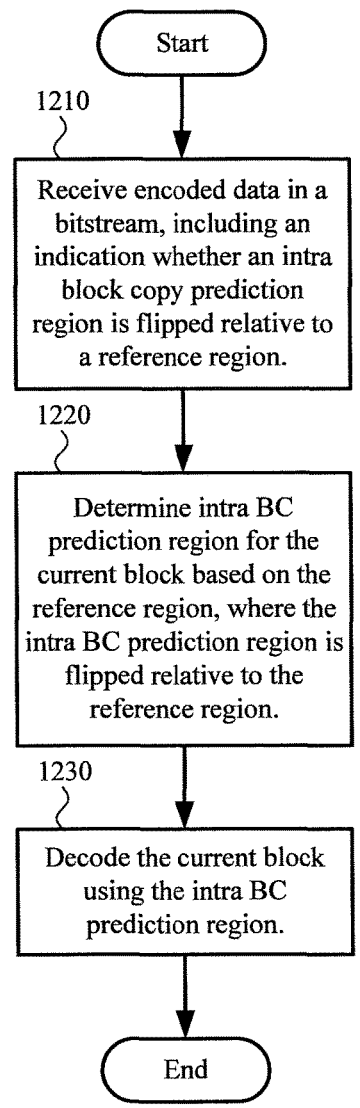

FIG. 12 shows an example technique (1200) for block flipping in intra BC prediction during decoding. An image decoder or video decoder such as one described with reference to FIG. 4 or FIG. 6 can perform the technique (1200).

The decoder receives (1210) encoded data in a bitstream. The encoded data includes an indication whether an intra BC prediction region for a current block in a picture is flipped relative to a reference region in the picture. The current block can be a PU, CU or other block. For example, the indication is one or more syntax elements in the bitstream. Examples of approaches to signaling whether block flipping is used are described above (see section VII.B.3).

The decoder determines (1220) the intra BC prediction region for the current block in the picture based on the reference region in the picture. A BV value for the current block can indicate a displacement to the reference region. Alternatively, a hash value for the current block can indicate the reference region in a block hash dictionary. The intra BC prediction region is flipped relative to the reference region. For example, the intra BC prediction region is flipped horizontally and/or vertically relative to the reference region. Examples of approaches to performing block flipping operations are described above (see section VII.B.2). The decoder decodes (1230) the current block using the intra BC prediction region.

The decoder can similarly decode other intra-BC-predicted blocks on a block-by-block basis for a slice, tile or picture, with or without block flipping.

C. Skip Mode for Intra BC Prediction.

In some previous approaches to intra BC prediction, a flag for a current CU indicates whether the CU is coded in intra BC prediction mode. If so, a second flag for the current CU indicates whether the CU has residual data. This manner of signaling intra-BC-predicted blocks that lack residual data is inefficient in many screen content coding/decoding scenarios.

According to another aspect of the innovations described herein, an encoder and decoder use a flag to signal an intra-BC-predicted block that lacks residual data. In skip mode, an intra-BC-predicted block uses a BV value, with a BV differential signaled in the bitstream, and has no residual data in the bitstream. In particular, for screen capture content, intra-BC-predicted blocks with no residual data are common. Using a single flag (as opposed to multiple flags) to signal an intra-BC-predicted block with no residual data is efficient in such scenarios.

1. Example Signaling for Intra BC Prediction Skip Mode.

In example implementations, a single flag in the bitstream indicates whether or not a current block is an intra-BC-predicted block in skip mode. If the current block is not an intra-BC-predicted block in skip mode, a second flag in the bitstream indicates whether or not the current block is an intra-BC-predicted block (not in skip mode). If the current block is not an intra-BC-predicted block, one or more other syntax elements in the bitstream indicate the mode of the current block (e.g., a flag for temporal skip mode or not, a flag for intra spatial prediction mode or not, a flag for inter-picture mode or not, a flag for intra spatial prediction mode or inter-picture mode). If the current block is an intra-BC-predicted block in skip mode, the second flag and other syntax elements are not present in the bitstream for the current block.

The flag that indicates whether a current block is an intra-BC-predicted block in skip mode is signaled at block level. The current block can be a CU of size 2N×2N. For example, for a 16×16 CU, N is 8. Alternatively, the current block can be a PU or other type of block. Other flags and syntax elements indicating the mode of the current block may also be signaled at block level in the bitstream.

In some example implementations, an intra-BC-predicted block in skip mode lacks residual data but includes a BV differential in the bitstream. Alternatively, the intra-BC-predicted block in skip mode can use a predicted BV value (and hence lack a BV differential in the bitstream).

2. Example Encoding with Intra BC Prediction Skip Mode.

FIG. 13 shows an example technique (1300) for encoding an intra-BC-predicted block in skip mode. An image encoder or video encoder such as one described with reference to FIG. 3 or FIGS. 5*a*-5*b* can perform the technique (1300).

The encoder determines (1310) a BV value for a current block (e.g., CU, PU) in a picture, e.g., using BV estimation. The BV value for the current block indicates a displacement to a reference region in the picture. The encoder then determines (1320) a BV differential for the current block using the BV value for the current block and a BV predictor for the current block. The BV predictor can be selected by rule, or the encoder can select the BV predictor from among multiple BV predictor candidates.

The encoder encodes (1330) the current block using intra BC prediction with the BV value. In example implementations, the intra BC prediction can include determining an intra BC prediction region for the current block using the reference region, where the intra BC prediction region is flipped relative to the reference region. The intra BC prediction region can be flipped horizontally and/or vertically relative to the reference region. Options for performing block flipping operations and signaling use of block flipping are described above. Alternatively, the encoder does not use block flipping in intra BC prediction.

The encoder outputs (1340) in a bitstream encoded data. The encoded data includes a flag indicating that the current block is encoded using intra BC prediction in skip mode. Since the current block is an intra-BC-predicted block in skip mode, the bitstream includes the BV differential for the current block but lacks residual data for the current block. When the encoder has selected the BV predictor from among multiple BV predictor candidates, the bitstream includes an index value that indicates the selected the BV predictor candidate to use as the BV predictor for the current block.

FIG. 14 shows an example technique (1400) for encoding blocks in a picture using intra BC prediction in skip mode and/or other modes. An image encoder or video encoder such as one described with reference to FIG. 3 or FIGS. 5*a*-5*b* can perform the technique (1400).

To start, the encoder gets (1410) the next block and determines (1420) whether to encode the block using intra BC prediction in skip mode. For example, the encoder evaluates whether intra BC prediction provides sufficient coding efficiency for the block and evaluates whether the residual data includes any significant values. Alternatively, the encoder considers other criteria. Section VIII describes example approaches that an encoder can follow when making decisions about whether to use intra-BC-predicted skip mode.

The encoder can signal a flag in the bitstream that indicates whether or not the block is encoded using intra BC prediction in skip mode. For an intra-BC-predicted block in skip mode, the encoder encodes (1430) the block with intra BC prediction in skip mode using the operations shown in stages (1310) to (1330) of FIG. 13 or using another approach. As an intra-BC-predicted block in skip mode, the block has a BV differential in the bitstream but lacks residual data in the bitstream.

Otherwise (block not an intra-BC-predicted block in skip mode), the encoder encodes (1440) the block in another mode. The other mode can be an intra BC prediction non-skip mode, an intra spatial prediction mode, inter-picture mode or other mode. In this case, one or more other syntax elements can indicate the mode of the block. For example, after a first flag that indicates whether or not the block is encoded using intra BC prediction in skip mode (depending on the decision at stage (1420), when the block is not encoded using intra BC prediction in skip mode, a second flag indicates whether or not the block is encoded using intra BC prediction in non-skip mode. If the block is not encoded using intra BC prediction in non-skip mode, one or more other syntax elements indicate the coding mode for the block. For example, a flag indicates whether the prediction mode of the block is intra spatial prediction or inter-picture prediction.

In some example implementations, there are additional advantages to using a flag that indicates whether or not a block is intra-BC-predicted in skip mode. In some cases, signaling of a syntax element that indicates partitioning mode (e.g., 2N×2N, 2N×N, N×2N or N×N) for an intra-BC-predicted block can be avoided. For example, if a block is encoded using intra BC prediction in non-skip mode, the encoder signals in the bitstream the syntax element that indicates partitioning mode for the block. On the other hand, if the block is encoded using intra BC prediction in skip mode, the encoder skips signaling in the bitstream of the syntax element that indicates the partitioning mode for the block, and the partitioning mode for the block is instead assumed to have a defined value (e.g., 2N×2N). Thus, in these cases, the earlier flag marking the block as intra-BC-predicted in skip mode also signals that the partitioning mode for the block has the defined value.

Also, in many cases, signaling of a flag that indicates the presence or absence of residual data for the block can be avoided. Of course, if the block is encoded using intra BC prediction in skip mode, the encoder skips signaling in the bitstream of the flag that indicates presence or absence of residual data for the block. (The earlier flag marking the block as intra-BC-predicted in skip mode already signals such information.) The residual data for the block is assumed to be absent from the bitstream.

Signaling of the flag that indicates presence or absence of residual data can be avoided in another case too. Specifically, if the block is encoded using intra BC prediction in non-skip mode, and the partitioning mode for the block has a defined value (e.g., 2N×2N), the encoder skips signaling in bitstream of the flag that indicates presence or absence of residual data for the block. In this case, the residual data for the block is assumed to be present in the bitstream. (If the partitioning mode of the block is the defined value and the block lacks residual data, the block would be an intra-BC-predicted block in skip mode, which would have been indicated by the earlier flag.) Finally, if the block is encoded using intra BC prediction in non-skip mode, and the partitioning mode for the block does not have the defined value, the encoder signals in bitstream the flag that indicates presence or absence of residual data for the block.

The encoder determines (1450) whether to continue with the next block in the picture. If so, the encoder gets (1410) the next block and continues encoding.

The encoder can repeat the technique (1400) on a picture-by-picture basis, tile-by-tile basis, slice-by-slice basis or some other basis.

3. Example Decoding with Intra BC Prediction Skip Mode.

Figure 15:
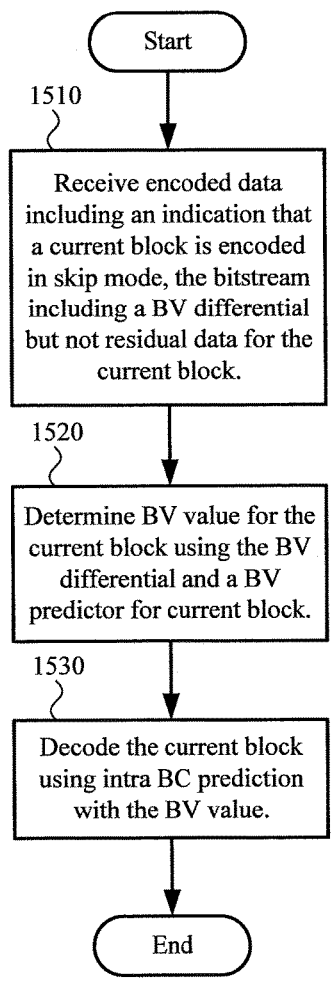
FIGS. 15 and 16 are flowcharts illustrating techniques for decoding that includes skip mode for intra-BC-predicted blocks.

FIG. 15 shows an example technique (1500) for decoding an intra-BC-predicted block in skip mode. An image decoder or video decoder such as one described with reference to FIG. 4 or FIG. 6 can perform the technique (1500).

The decoder receives (1510) encoded data from a bitstream. The encoded data includes a flag indicating that a current block (e.g., CU, PU) in a picture is encoded using intra BC prediction in skip mode. Since the current block is an intra-BC-predicted block in skip mode, the bitstream includes a BV differential for the current block but lacks residual data for the current block.

The decoder determines (1520) a BV value for the current block using the BV differential for the current block and a BV predictor for the current block. The BV value for the current block indicates a displacement to a reference region in the picture. The BV predictor can be selected by rule. Or, the decoder can select the BV predictor from among multiple BV predictor candidates, using an index value in the bitstream to select which of the BV predictor candidate to use as the BV predictor for the current block.

The decoder decodes (1530) the current block using intra BC prediction with the BV value. In example implementations, the intra BC prediction can include determining an intra BC prediction region for the current block using the reference region, where the intra BC prediction region is flipped relative to the reference region. The intra BC prediction region can be flipped horizontally and/or vertically relative to the reference region. Options for performing block flipping operations and signaling use of block flipping are described above. Alternatively, the decoder does not use block flipping in intra BC prediction.

Figure 16:
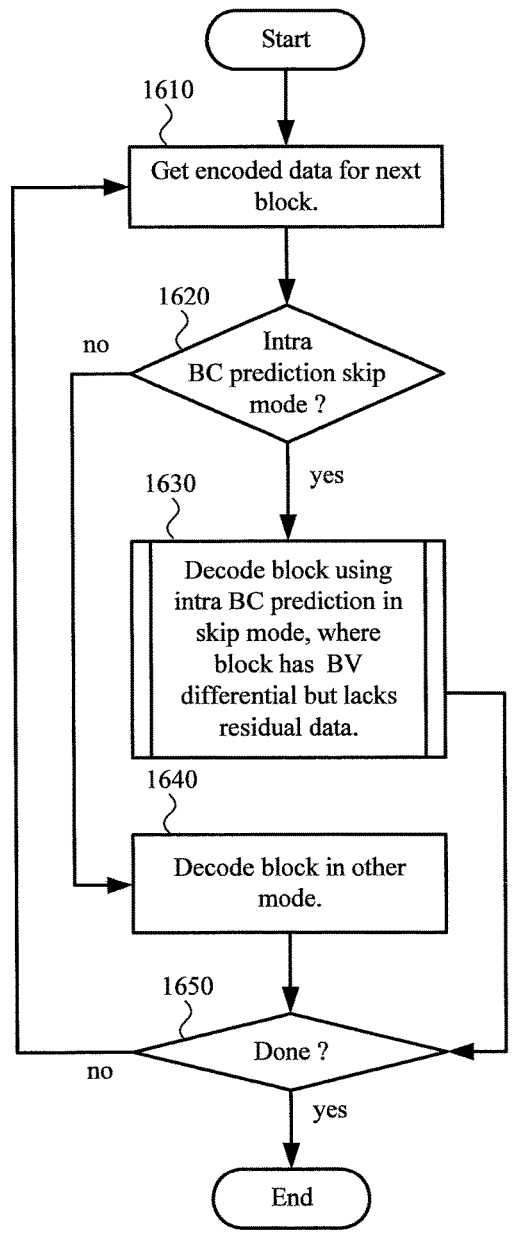

FIG. 16 shows an example technique (1600) for decoding blocks in a picture using intra BC prediction in skip mode and/or other modes. An image decoder or video decoder such as one described with reference to FIG. 4 or FIG. 6 can perform the technique (1600).

To start, the decoder gets (1610) encoded data for the next block and determines (1620) whether to decode the block using intra BC prediction in skip mode. For example, the decoder receives and parses a flag in the bitstream that indicates whether or not the block has been encoded using intra BC prediction in skip mode.

For an intra-BC-predicted block in skip mode, the decoder decodes (1630) the block with intra BC prediction in skip mode using the operations shown in stages (1520) and (1530) of FIG. 15 or using another approach. As an intra-BC-predicted block in skip mode, the block has a BV differential in the bitstream but lacks residual data in the bitstream.

Otherwise (block not an intra-BC-predicted block in skip mode), the decoder decodes (1640) the block in another mode. The other mode can be an intra BC prediction non-skip mode, an intra spatial prediction mode, inter-picture mode or other mode. In this case, one or more other syntax elements can indicate the mode of the block. For example, after a first flag that indicates whether or not the block is encoded using intra BC prediction in skip mode (depending on the decision at stage (1620), when the block is not encoded using intra BC prediction in skip mode, a second flag indicates whether or not the block is encoded using intra BC prediction in non-skip mode. If the block is not encoded using intra BC prediction in non-skip mode, one or more other syntax elements indicate the coding mode for the block. For example, a flag indicates whether the prediction mode of the block is intra spatial prediction or inter-picture prediction.

As noted in the previous section, in some example implementations, there are additional advantages to using a flag that indicates whether a block is intra-BC-predicted in skip mode. For example, if a block is encoded using intra BC prediction in non-skip mode, the bitstream includes the syntax element that indicates partitioning mode for the block. On the other hand, if the block is encoded using intra BC prediction in skip mode, the bitstream lacks the syntax element that indicates the partitioning mode for the block. The decoder infers that the partitioning mode for the block is a defined value (e.g., 2N×2N).

Also, in many cases, signaling of a flag that indicates the presence or absence of residual data for the block can be avoided. Of course, if the block is encoded using intra BC prediction in skip mode, the bitstream lacks the flag that indicates presence or absence of residual data for the block. Instead, from the earlier flag marking the block as intra-BC-predicted in skip mode, the decoder infers that residual data for the block is absent from the bitstream.

Signaling of the flag that indicates presence or absence of residual data can be avoided in another case too. Specifically, if the block is encoded using intra BC prediction in non-skip mode, and the partitioning mode for the block has a defined value (e.g., 2N×2N), the bitstream lacks the flag that indicates presence or absence of residual data for the block. In this case, the decoder infers that the residual data for the block is present in the bitstream. Finally, if the block is encoded using intra BC prediction in non-skip mode, and the partitioning mode for the block does not have the defined value, the bitstream includes the flag that indicates presence or absence of residual data for the block.

The decoder determines (1650) whether to continue with the next block in the picture. If so, the decoder gets (1610) encoded data for the next block and continues decoding.

The decoder can repeat the technique (1600) on a picture-by-picture basis, tile-by-tile basis, slice-by-slice basis or some other basis.

4. Example Syntax for Coding Units.

FIGS. 17a and 17b show a syntax structure (1700) for a coding unit ("CU") according to a prior approach. The syntax elements shown in the syntax structure (1700) are defined in JCTVC-P1005. Selected syntax elements are summarized here.

The syntax element intra_bc_flag can be signaled for a CU when intra BC prediction is enabled (as indicated with the intra_block_copy_enabled_flag). The syntax element intra_bc_flag specifies whether or not the CU is encoded in intra BC prediction mode. If its value is 1, the CU is encoded in intra BC prediction mode. If its value is 0, the CU is not encoded in intra BC prediction mode. In this case (intra_bc_flag is 0), the syntax element pred_mode_flag is present and indicates whether the CU is encoded in inter prediction mode or intra spatial prediction mode.

If the block is intra-BC-predicted (and in a few other cases), the bitstream includes the part_mode syntax element for the CU. The part_mode syntax element indicates the partitioning mode for the CU (that is, 2N×2N, 2N×N, N×2N, N×N).

The CU syntax structure (1700) then includes BV values for partitions (if the CU is intra-BC-predicted), intra prediction direction information (if the CU is intra-spatial-predicted) or prediction unit information (if the CU is inter-predicted). Then, the CU syntax structure (1700) includes an rqt_root_cbf syntax element in some cases. In particular, the rqt_root_cbf syntax element is present if the CU is intra-BC-predicted. The rqt_root_cbf syntax element indicates whether a transform_tree( ) syntax structure is present for the CU. The transform_tree( ) syntax structure is for residual data for the CU. If rqt_root_cbf is 1, the transform_tree( ) syntax structure is present for the CU. If rqt_root_cbf is 0, the transform_tree( ) syntax structure is not present for the CU. When rqt_root_cbf is not present, its value is inferred to be 1. Thus, as previously noted, in this approach, two flags (intra_bc_flag and rqt_root_cbf) are used to indicate an intra-BC-predicted block in skip mode.

FIG. 18 shows a new syntax structure (1800) for a coding unit that can be encoded as an intra-BC-predicted block in skip mode. Changes relative to the syntax structure (1700) shown in FIGS. 17a and 17b are highlighted in FIG. 18.

The intra_bc_skip_flag can be signaled for a CU when intra BC prediction is enabled (as indicated with the intra_block_copy_enabled_flag). The syntax element intra_bc_skip_flag indicates whether or not the CU is an intra-BC-predicted block in skip mode. If the CU is intra-BC-predicted in skip mode (intra_bc_skip_flag equal to 1), the syntax elements intra_bc_flag and pred_mode_flag are skipped, as is the syntax element rqt_root_cbf. Also, the partitioning mode for the CU has the defined value 2N×2N in this case.

On the other hand, if the syntax element intra_bc_skip_flag indicates the CU is not intra-BC-predicted in skip mode (intra_bc_skip_flag equal to 0), the syntax element intra_bc_flag is present. The syntax element intra_bc_flag specifies whether or not the CU is encoded in intra BC prediction mode, as explained with reference to FIGS. 17a and 17b. Further, if intra_bc_flag is 0, the syntax element pred_mode_flag is present and indicates whether the CU is encoded in inter prediction mode or intra spatial prediction mode, as explained with reference to FIGS. 17a and 17b.

If the block is intra-BC-predicted in non-skip mode (that is, intra_bc_flag is 1 and intra_bc_skip_flag is 0), the bitstream includes a part_mode syntax element for the CU. The part_mode syntax element indicates the partitioning mode for the CU (e.g., 2N×2N, 2N×N, N×2N, N×N). On the other hand, if the block is intra-BC-predicted in skip mode, the part_mode syntax element is not signaled in the bitstream for the CU. Instead, the partitioning mode is inferred to have the defined value of 2N×2N. Thus, for such a block, the intra_bc_skip_flag signals that the partitioning mode for the CU has the defined value of 2N×2N, and separate signaling of the part_mode syntax element is avoided.

In sections omitted from FIG. 18, the syntax structure (1800) then includes BV values for partitions (if the CU is intra-BC-predicted), intra prediction direction information (if the CU is intra-spatial-predicted) or prediction unit information (if the CU is inter-predicted).

Finally, the syntax structure (1800) includes an rqt_root_cbf syntax element in some cases. In particular, the rqt_root_cbf syntax element is present if the CU is intra-BC-predicted in non-skip mode, so long as the partitioning mode of the CU is not the defined value of 2N×2N. When present, the value of the rqt_root_cbf syntax element indicates whether a transform_tree( ) syntax structure is present for the CU, as explained with reference to FIGS. 17a and 17b. On the other hand, the rqt_root_cbf syntax element is not present (1) if the CU is intra-BC-predicted in skip mode or (2) if the CU is intra-BC-predicted and the partitioning mode for the CU is the defined value of 2N×2N. If the CU is intra-BC-predicted in skip mode, the value of rqt_root_cbf is inferred to be 0 (residual data not present for the CU). Otherwise, if the CU is intra-BC-predicted and the partitioning mode for the CU is the defined value of 2N×2N, the value of rqt_root_cbf is inferred to be 1 (residual data is present for the CU).

VIII. Encoder-Side Decisions for Block Flipping and Intra-BC-Predicted Skip Mode.

This section presents various example approaches to encoder-side decision-making processes for block flipping and intra-BC-predicted skip mode. In the example approaches, an encoder uses hash-based block matching between a current block and candidate blocks during intra BC estimation (and/or motion estimation, for block flipping).

Although intra BC prediction can improve coding efficiency by exploiting redundancy (such as repeated patterns inside a frame) using BC operations, finding a matching block for a current block can be computationally complex and time-consuming due to the number of candidate blocks that the encoder may evaluate. Comparing the sample values of a current block to the sample values of a single candidate block in sample-wise block matching can involve thousands of operations. For example, comparing the sample values of a 64×64 current block and 64×64 candidate block can involve 64×64=4096 comparison operations (e.g., subtraction operations) as well as operations to tally results of the comparison operations.

Figure 19:
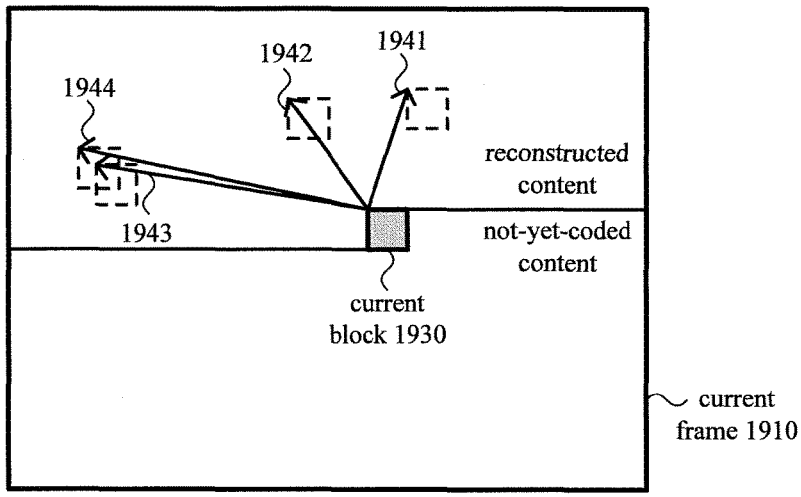
FIG. 19 is a diagram illustrating candidate blocks in block matching for a block of an example frame.

FIG. 19 shows some of the candidate blocks for a current block (1930) of a current frame (1910) in block matching operations. Four BVs (1941, 1942, 1943, 1944) indicate displacements for four candidate blocks. The candidate blocks can be anywhere within the reconstructed content of the frame (1910). (Blocks are generally coded from left-to-right, then from top-to-bottom.) A candidate block can overlap with other candidate blocks, as shown for the candidate blocks indicated by the BVs (1943, 1944). The computational complexity of BV estimation is especially problematic when the search range for BV values encompasses all of the previously reconstructed areas of a frame, due to the large number of candidate blocks against which a current block may be compared.

Performing sample-wise block matching operations between a current block and even a small set of the possible candidate blocks can be very computationally intensive. If block hash values are computed for candidate blocks of an entire frame, the number of operations is even higher. Similarly, if the search range includes one or more previously reconstructed frames (reference frame(s) for motion estimation), sample-wise block matching can consume a very large number of operations, due to the large number of candidate blocks against which a current block is compared.

A. Hash-Based Block Matching.

When an encoder uses hash-based block matching, the encoder determines a hash value for each of multiple candidate blocks. A hash table stores the hash values for the candidate blocks. The encoder also determines a hash value for a current block by the same hashing approach, and then searches the hash table for a matching hash value. If two blocks are identical, their hash values are the same. Using hash values, an encoder can quickly and efficiently identify candidate blocks that have the same hash value as the current block, and filter out candidate blocks that have different hash values. The encoder can then further evaluate those candidate blocks having the same hash value as the current block. (Different blocks can have the same hash value. So, among the candidate blocks with the same hash value, the encoder can identify a candidate block that matches the current block.) Hash-based block matching typically speeds up the block matching process.

In some example implementations, the candidate blocks considered in hash-based block matching include input sample values. That is, the candidate blocks are part of an input version of a picture. Hash values for the candidate blocks are determined from the input sample values. During hash-based block matching, the encoder determines the hash value for a current block using input sample values. The encoder compares it (or otherwise uses the hash value) against the hash values determined from input sample values for candidate blocks. Even so, reconstructed sample values from the matching block are used to represent the current block. Thus, BC prediction operations still use reconstructed sample values. Alternatively, the candidate blocks considered in hash-based block matching include reconstructed sample values. That is, the candidate blocks are part of previously encoded then reconstructed content in a picture. Hash values for the candidate blocks are determined from the reconstructed sample values. During hash-based block matching, the encoder determines the hash value for a current block using input sample values. The encoder compares it (or otherwise uses the hash value) against the hash values determined from reconstructed sample values for candidate blocks. The hash table grows during encoding, as more candidate blocks are added to the reconstructed content of a picture and hence made available for use in hash-based block matching for later blocks of the picture.

FIG. 20 illustrates hash values (2000) for candidate blocks B(x, y) in hash-based block matching, where x and y indicate horizontal and vertical coordinates, respectively, for the top-left position of a given candidate block. The candidate blocks have hash values determined using a hash function h( ) For a candidate block B(x, y) in a search range, the encoder determines a hash value h(B) for the candidate block. The encoder can determine hash values for all candidate blocks in the search range. Or, the encoder can screen out candidate blocks having certain patterns of sample values.

In general, the hash function h( ) yields n possible hash values, designated $h_0$ to $h_{n-1}$. For a given hash value, the candidate blocks with that hash value are grouped. For example, in FIG. 20, the candidate blocks B(1266, 263), B(1357, 365), B(1429, 401), B(502, 464), . . . have the hash value $h_0$. Groups can include different numbers of candidate blocks. For example, in FIG. 20, the group for hash value $h_4$ includes a single candidate block, while the group for hash value $h_0$ includes more than four candidate blocks.

In this way, the possible candidate blocks are distributed into n categories. For example, if the hash function h( ) produces 12-bit hash values, the candidate blocks are split into $2^{12}$=4,096 categories. In some implementations, the number of candidate blocks per hash value can be further reduced by eliminating redundant, identical blocks with that hash value, or by screening out candidate blocks having certain patterns of sample values. Also, in some implementations, the encoder can iteratively winnow down the number of candidate blocks using different hash functions.

The hash function h( ) can be a cryptographic hash function, cyclic redundancy check ("CRC") function or other hash function. Some types of hash function (e.g., CRC function) map similar blocks to different hash values, which may be efficient when seeking a matching block that exactly corresponds with a current block. Other types of hash function (e.g., locality-sensitive hash function) map similar blocks to the same hash value, which may be suitable when a matching block can approximate the current block. Example hash functions are described below (see section VIII.D).

During hash-based block matching, with the hash function h( ), the encoder determines the hash value for the current block $B_{current}$. In FIG. 20, the hash value $h(B_{current})$ is $h_3$. Using the hash value of the current block, the encoder can identify candidate blocks that have the same hash value (shown in outlined box in FIG. 20), and filter out the other candidate blocks. When a hash function maps similar blocks to different hash values, the identified candidate blocks (same hash value as the current block) include blocks that might be identical to the current block. When a hash function maps similar blocks to the same hash value, the identified candidate blocks (same hash value as the current block) include blocks that might be identical to the current block or might be close approximations of the current block. Either way, from these identified candidate blocks, the encoder can identify a matching block for the current block (e.g., using sample-wise block matching operations).

Overall, since hash value comparisons are much simpler than sample-wise block matching, hash-based block matching can make the process of evaluating the candidate blocks in a large search range much more efficient. Also, hash values for candidate blocks can be reused in hash-based block matching for different blocks within a picture during encoding. In this case, the cost of computing the hash values for the candidate blocks can be amortized across hash-based block matching operations for the entire picture.

B. Data Structures for Hash-Based Block Matching.

In some example implementations, the encoder uses a data structure that organizes candidate blocks according to their hash values. The data structure can help make hash-based block matching more computationally efficient. The data structure implements, for example, a block hash dictionary or hash table as described herein.

FIG. 21a illustrates an example data structure (2100) that organizes candidate blocks for hash-based block matching. For the hash function h( ), the n possible hash values are $h_0$ to $h_{n-1}$. Candidate blocks with the same hash value are classified in the same candidate block list. A given candidate block list can include zero or more entries. For example, the candidate block list for the hash value $h_2$ has no entries, the list for the hash value $h_6$ has two entries, and the list for the hash value $h_1$ has more than four entries.

An entry($h_i$,k) includes information for the $k^{th}$ candidate block with the hash value $h_i$. As shown in FIG. 21b, an entry in a candidate block list can include the address of a block B(x, y) (e.g., horizontal and vertical coordinates for the top-left position of the block). Or, as shown in FIG. 21c, an entry in a candidate block list can include the address of a block B(x, y) and a hash value from a second hash function, which can be used for iterative hash-based block matching.

During hash-based block matching for a current block (for BV estimation or motion estimation), the encoder determines the hash value of the current block $h(B_{current})$ The encoder retains the candidate block list with the same hash value and rules out the other n−1 lists. To select the matching block, the encoder can compare the current block with the candidate block(s), if any, in the retained candidate block list. Thus, by a simple lookup operation using the hash value $h(B_{current})$, the encoder can eliminate (n−1)/n of the candidate blocks (on average), and focus on the remaining 1/n candidate blocks (on average) in the retained list, significantly reducing the number of sample-wise block matching operations.

The data structure can be considered a dynamic dictionary in which each entry represents a candidate block. When hash values for candidate blocks are determined from input sample values, the data structure grows as block hash values are computed for more blocks. The number of blocks represented with block hash values can vary, depending on how many blocks the encoder screens out. Also, the number of blocks that have a given block hash value will change from picture-to-picture. During encoding, the encoder checks that a candidate block with a matching block hash value is actually available for use as a reference region (e.g., is part of a previously encoded and reconstructed content). When hash values for candidate blocks are determined from reconstructed sample values, the data structure grows during encoding, as more candidate blocks are added to the reconstructed content of a picture and hence made available for use in hash-based block matching for later blocks of the picture. In particular, after a current block is encoded, new candidate blocks that overlap the just-encoded current block are available for use as reference regions.

Different data structures can be used for different sizes of blocks. For example, one data structure includes hash values for 8×8 candidate blocks, a second data structure includes hash values for 16×16 candidate blocks, a third data structure includes hash values for 32×32 candidate blocks, and so on. The data structure used during hash-based block matching depends on the size of the current block. Alternatively, a single, unified data structure can be used for different sizes of blocks. A hash function can produce an n-bit hash value, where m bits of the n-bit hash value indicate a hash value among the possible blocks of a given block size according to an m-bit hash function, and the remaining n-m bits of the n-bit hash value indicate the given block size. For example, the first two bits of a 14-bit hash function can indicate a block size, while the remaining 12 bits indicate a hash value according to a 12-bit hash function. Or, a hash function can produce an m-bit hash value regardless of the size of the block, and an entry for a candidate block in the data structure stores information indicating the block size for the candidate block, which can be used in hash-based block matching. Section VIII.D includes additional details about example hash functions whose hash values can be organized in a single, unified data structure.

For a high-resolution picture, the data structure can store information representing a very large number of candidate blocks. To reduce the amount of memory used for the data structure, the encoder can eliminate redundant values. For example, the encoder can avoid adding identical blocks to the data structure by using the following approach. Before adding a new candidate block $B_{new}$ to the data structure, the encoder checks if there is already a candidate block represented in the data structure that is identical to $B_{new}$. For this check, the encoder can determine the hash value for the new candidate block, then further evaluate those candidate blocks represented in the data structure that have the same hash value. (Candidate blocks with different hash values are necessarily different than the new candidate block $B_{new}$.) If the data structure already includes a candidate block that is identical to $B_{new}$, then $B_{new}$ is added instead of the previous identical candidate block, or the previous identical candidate block is simply retained. If the data structure does not include a candidate block that is identical to $B_{new}$, then $B_{new}$ is added to the data structure.

In general, reducing the size of the data structure by eliminating identical blocks can hurt coding efficiency. When multiple identical candidate blocks are potentially available, they may result in different BV values for a current block, where one of the BV values can be encoded with fewer bits than the other(s). Also, candidate blocks that have identical original sample values (and hence the same hash value) may have different reconstructed values, in which case using one of the candidate blocks may result in better prediction than using the other(s). If only one of the multiple identical candidate blocks is retained in the data structure, the encoder might not learn of a BV value that would be more efficiently encoded for the current block, or might select a block whose reconstructed values lead to inferior prediction for the current block. Thus, by deciding whether to eliminate identical blocks, the encoder can trade off memory size for the data structure and coding efficiency. The encoder can also screen out candidate blocks, depending on the content of the blocks, which are unlikely to benefit from intra BC prediction.

C. Iterative Hash-Based Block Matching.

When the encoder uses a single hash function with n possible hash values, the encoder can rule out n−1 lists of candidate blocks based on the hash value of a current block, but the encoder may still need to perform sample-wise block matching operations for the remaining candidate block(s), if any, for the list with the matching hash value. Also, when updating a data structure that organizes candidate blocks, the encoder may need to perform sample-wise block matching operations to identify identical blocks. Collectively, these sample-wise block matching operations can be computationally intensive.

Therefore, in some example implementations, the encoder uses iterative hash-based block matching. Iterative hash-based block matching can speed up the block matching process and also speed up the process of updating a data structure that organizes candidate blocks.

Iterative hash-based block matching uses multiple hash values determined with different hash functions. For a block B (current block or candidate block), in addition to the hash value h(B), the encoder determines another hash value h'(B) using a different hash function h'( ). With the first hash value $h(B_{current})$ for a current block, the encoder identifies candidate blocks that have the same hash value for the first hash function h( ) To further rule out some of these identified candidate blocks, the encoder uses a second hash value $h'(B_{current})$ for the current block, which is determined using a different hash function. The encoder compares the second hash value $h'(B_{current})$ with the second hash values for the previously identified candidate blocks (which have same first hash value), in order to filter out more of the candidate blocks. A hash table tracks hash values for the candidate blocks according to the different hash functions.

In the example of FIG. 21a, if $h(B_{current})=h_3$, the encoder selects the candidate blocks with entry(3, 0), entry (3, 1), entry(3, 2), entry(3, 3), . . . for further refinement. As shown in FIG. 21c, for a candidate block B, an entry includes a block address and a second hash value h'(B) from the hash function h'( ). The encoder compares the second hash value $h'(B_{current})$ for the current block with the second hash values h'(B) for the respective candidate blocks with entry(3, 0), entry (3, 1), entry(3, 2), entry(3, 3), . . . . Based on results of the second hash value comparisons, the encoder can rule out more of the candidate blocks, leaving candidate blocks, if any, that have first and second hash values matching $h(B_{current})$ and $h'(B_{current})$, respectively. The encoder can perform sample-wise block matching on any remaining candidate blocks to select a matching block.

FIGS. 22a-22c show another example of iterative hash-based block matching that uses a different data structure. The data structure (2200) in FIG. 22a organizes candidate blocks by first hash value from a first hash function h( ), which has n1 possible hash values. The data structure (2200) includes lists for hash values from $h_0$ . . . $h_{n1-1}$. In the example, the encoder determines a first hash value $h(B_{current})=h_2$ for the current block, and selects the list for $h_2$ from the structure (2200).

As shown in FIG. 22b, the list (2210) for $h_2$ includes multiple lists that further organize the remaining candidate blocks by second hash value from a second hash function h'( ), which has n2 possible hash values. The list (2210) includes lists for hash values from $h'_0$ . . . $h'_{n2-1}$, each including entries with block addresses (e.g., horizontal and vertical coordinates for top-left positions of respective candidate blocks), as shown for the entry (2220) in FIG. 22c. In the example, the encoder determines a second hash value $h'(B_{current})=h'_0$ for the current block, and selects the list for $h'_0$ from the list (2210). For the candidate blocks in the list for $h'_0$, the encoder can perform sample-wise block matching to select a matching block. In this example, the lists for the second hash values are specific to a given list for the first hash value. Alternatively, there is one set of lists for the second hash values, and the encoder identifies any candidate blocks that are (1) in the matching list for the first hash values and also (2) in the matching list for the second hash values.

Aside from hash-based block matching, the second hash function h'( ) can be used to simplify the process of updating a data structure that organizes candidate blocks. For example, when the encoder checks whether a new candidate block is identical to a candidate block already represented in the data structure, the encoder can use multiple hash values with different hash functions to filter out non-identical blocks. For remaining candidate blocks, the encoder can perform sample-wise block matching to identify any identical block.

In the preceding examples, the iterative hash-based block matching and updating use two different hash functions. Alternatively, the encoder uses three, four or more hash functions to further speed up hash-based block matching or filter out non-identical blocks, and thereby reduce the number of sample-wise block matching operations.

Alternatively, for a low-complexity encoder, the encoder can skip sample-wise block matching operations when hash values match. For hash functions with a large number of possible hash values, there is a high probability that two blocks are identical if all hash values for the two blocks match. In particular, instead of using sample-wise block matching to confirm that blocks are identical when updating the data structure, the encoder can rely on hash value comparisons to evaluate whether blocks are identical. The encoder removes a candidate block from the data structure (or does not add a new candidate block) if all hash values match for the two blocks, under the assumption that the new candidate block and existing candidate block are identical. If a hash value does not match, the new candidate block is added to the data structure. This may result in the exclusion of some non-identical blocks from the data structure, but sample-wise block matching operations are avoided.

D. Example Hash Functions.

The hash function used for hash-based block matching depends on implementation.

A hash function can produce hash values with 8 bits, 12 bits, 16 bits, 24 bits, 32 bits, or some other number of bits. If a hash value has fewer bits, the data structure includes fewer categories, but each category may include more candidate blocks. On the other hand, using hash values with more bits tends to increase the size of the data structure that organizes candidate blocks. If a hash value has more bits, the data structure includes more categories, but each category may include fewer candidate blocks.

In some example implementations, the hash function used in hash-based block matching (and/or hash-based block reconstruction) is a cyclic redundancy check ("CRC") function or part of a CRC. CRC functions are fast and widely implemented, since they are commonly used for error checking purposes. A CRC function tends to produce very different hash values when applied to similar input values. That is, changing the sample values of a block slightly can lead to different CRC hash values. A CRC function can produce hash values with 8 bits, 12 bits, 16 bits, 24 bits, 32 bits, or some other number of bits.

When used for hash-based block matching, CRC functions work well to find a matching block that is exactly identical to a current block. A CRC function typically does not help find a matching block that only approximates a current block, however.

In other example implementations, the hash function used in hash-based block matching (or hash-based block reconstruction) is a cryptographic hash function or part thereof. For example, the hash value can be a MD5 value, SHA value, part of a MD5 value or part of a SHA value.

In other example implementations, the hash function used in hash-based block matching (or hash-based block reconstruction) uses averaging and XOR operations to determine the signature of a candidate block or current block. A hash value includes a component based on average of the block and one or more components based on directional XOR operations.

For example, for an 8×8 block B[i,j] with 8-bit sample values, the hash value is a 24-bit value with three 8-bit components. The first 8-bit component is the average μ of the sample values in the block.

$$\mu = \frac{\Sigma_{0 \leq i < 8, 0 \leq j < 8} B[i,j]}{64}.$$

For the second and third 8-bit components, a level map L[i,j] of sample values is derived using the average value μ for the block.

$$L[i,j] = \begin{cases} 1, \text{ when } B[i,j] > \mu \\ 0, \text{ otherwise} \end{cases}, 0 \leq i < 8, \text{ and } 0 \leq j < 8.$$

The second 8-bit component r is based on XOR operations along rows of the level map L[i,j]. For each row 0≤j<8 of the level map L[i,j], a bit r[j] of the second component is determined.

$$r[j] = L[0,j] \oplus L[1,j] \oplus L[2,j] \oplus L[3,j] \oplus L[4,j] \oplus L[5,j] \oplus L[6,j] \oplus L[7,j],$$

where ⊕ represents an XOR operation.

The third 8-bit component c is based on XOR operations along columns of the level map L[i,j]. For each column 0≤i<8 of the level map L[i,j], a bit c[i] of the third component is determined.

$$c[i] = L[i,0] \oplus L[i,1] \oplus L[i,2] \oplus L[i,3] \oplus L[i,4] \oplus L[i,5] \oplus L[i,6] \oplus L[i,7].$$

Thus, for the second component r, the $j^{th}$ bit is the XOR of the $j^{th}$ row's level map. And, for the third component c, the $i^{th}$ bit is the XOR of the $i^{th}$ column's level map. The 24-bit hash value is (μ<<16)+(r<<8)+c, where << represents a left shift operation.

For this hash function, the second and third components (based on XOR operations) are sensitive to small variations in sample values. When used for hash-based block matching, hash functions based on averaging and XOR operations work well to find a matching block that is exactly identical to a current block, however.

Instead of 8×8 blocks, a hash function that uses averaging and XOR operations can be used for a different size of block, e.g., computing XOR operations along pairs of rows or pairs of columns for a 16×16 block to determine an 8-bit component r or c, computing XOR operations along groups of four rows or four columns for a 32×32 block to determine an 8-bit component r or c, and so on. Alternatively, a hash function that uses averaging and XOR operations can produce hash values with a different number of bits.

In other example implementations, the hash function used in hash-based block matching (or hash-based block reconstruction) is a locality-sensitive hash function. A locality-sensitive hash function tends to produce the same hash value when applied to similar input values. That is, changing the sample values of a block slightly typically does not lead to different hash values. A locality-sensitive hash function can produce hash values with 8 bits, 12 bits, 16 bits, 24 bits, 32 bits, or some other number of bits.

For example, for an 8×8 block B, a 64-dimension vector $\vec{b}$ is generated from the 64 sample values of the block B. Another 64-dimension vector $\vec{v}$ is randomly generated. The hash function depends on the product $\vec{b} \cdot \vec{v}$. For example, the hash function can be $$h(\vec{b}) = \left\lfloor \frac{\vec{v} + \vec{b} + d}{d_{range}} \right\rfloor,$$

where d is a real number chosen from the range 0 ... $d_{range}$. If two blocks are similar, then their vectors $\vec{b}_1$ and $\vec{b}_2$ are similar, and their hash values $h(\vec{b}_1)$ and $h(\vec{b}_2)$ should also be the same or similar.

In some example implementations, the hash function used in hash-based block matching (or hash-based block reconstruction) includes block width and block height as input. For example, the hash function can be a modified CRC function, modified cryptographic hash function, modified hash function that uses averaging and XOR operations, or modified locality-sensitive hash function, for which the hash value depends in part on block height and block width as inputs. With this variation of hash function, candidate blocks of different sizes (such as 64×64, 32×32, 16×16 and 8×8) can be organized within a single data structure. A modified hash function can produce an n-bit hash value, of which m bits indicate a hash value according to an underlying m-bit hash function. The remaining n-m bits of the n-bit hash value indicate a block size. For example, suppose a modified hash function produces a 14-bit hash value, where the first two bits indicate a block size among four options, and the remaining 12 bits indicate a hash value among blocks of that size. A block is hashed, yielding a 12-bit hash value in the range 0 ... 4095. If the block size is 4×4, 0<<12 is added to the 12-bit hash value. If the block size is 8×8, 1<<12 is added to the 12-bit hash value. If the block size is 16×16, 2<<12 is added to the 12-bit hash value. And, if the block size is 32×32, 3<<12 is added to the 12-bit hash value. This yields a 14-bit hash value in the range 0 ... 16383, where hash values in the range 0 ... 4095 are for 4×4 blocks, hash values in the range 4096 ... 8191 are for 8×8 blocks, hash values in the range of 8192 ... 12287 are for 16×16 blocks, and hash values in the range of 12288 ... 16383 are for 32×32 blocks. If more block sizes are possible, 3, 4 or more bits can be assigned to indicate the block size of a block. Alternatively, the n-m bits that indicate the block size can be the least significant bits of the n-bit hash value, with the m-bit value being left shifted by n-m bits before adding the n-m bits for block size.

Alternatively, a hash function works for different sizes of blocks, but the hash function produces an m-bit hash value regardless of the size of the block. Candidate blocks of different block sizes can still be organized within a single data structure, but an entry for a candidate block includes information indicating the block size for that block. The block size information may be used during hash-based block matching to check the block size of a candidate block, compared to the block size of the current block.

Alternatively, another hash function is used for hash-based block matching.

E. Intra BC Prediction Mode—Implementation Options.

A block with prediction mode of intra BC prediction can be a CB, PB or other block. When the block is a CB, the BV value for the block can be signaled at CU level (and other CBs in the CU use the same BV value or a scaled version thereof). Or, when the block is a PB, the BV value for the block can be signaled at PU level (and other PBs in the PU use the same BV value or a scaled version thereof). More generally, the BV value for an intra-BC prediction block is signaled at an appropriate syntax level for the block.

The block copying operations of prediction according to the intra BC prediction mode can be performed at the level of CB (when a BV value is signaled per CB) or PB (when a BV value is signaled per PB). For example, suppose a 16×16 CB has a single 16×16 PB. The BV value (for the PB) is applied to block copy a 16×16 region. Alternatively, the block copying operations can be performed at the level of TBs within a PB or CB, even when the BV value is signaled for the PB or CB. In this way, a BV value, as applied for a TB, can reference positions of other TBs in the same PB or CB.

In some implementations, for an intra BC predicted CU, intra BC prediction for a chroma block in a PU uses the same BV value as intra BC prediction for the luma block in the PU, possibly after scaling and rounding when the chroma data has reduced resolution relative to the luma data (e.g. when the format is YUV 4:2:0 format). Alternatively, different BV values can be signaled for the luma block and chroma blocks of a PU.

F. Example Video Encoders with Hash-Based Block Matching.

Figure 23A:
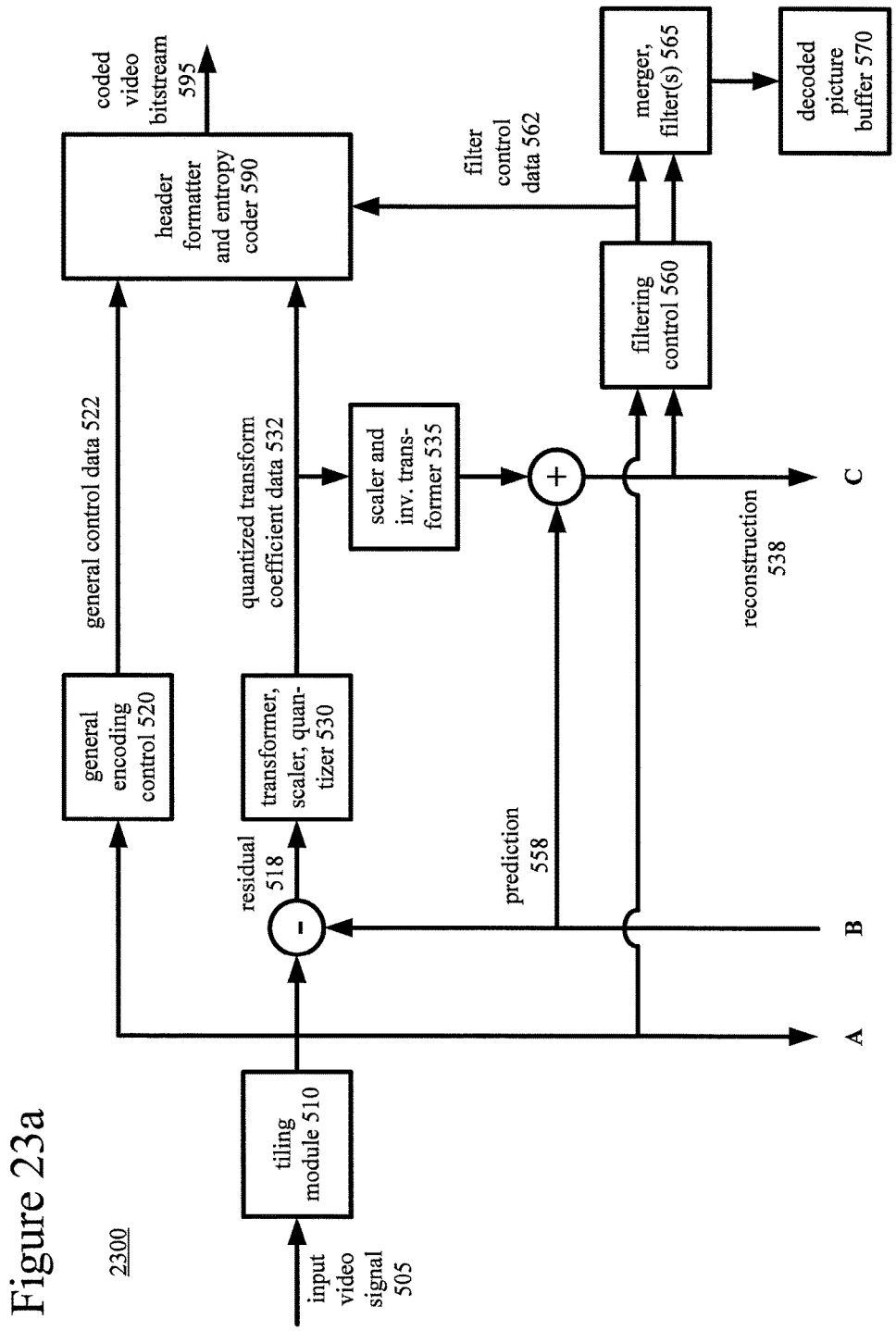
FIGS. 23a and 23b are diagrams illustrating a second example video encoder.
Figure 23B:
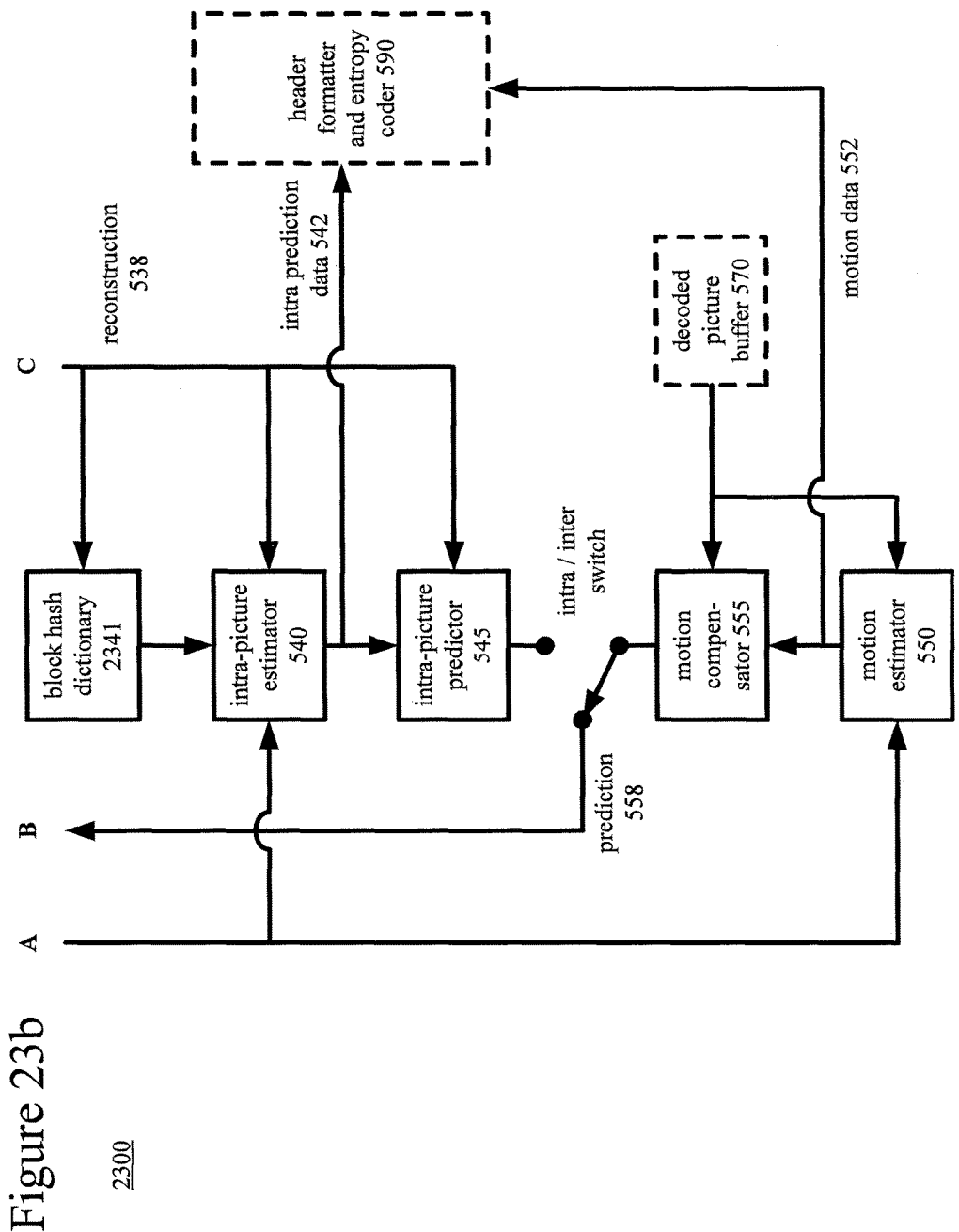

FIGS. 23a and 23b show a generalized video encoder (2300) that determines hash values from reconstructed sample values for use in hash-based block matching. In most respects, the modules of the encoder (2300) are identical to the modules of the encoder (500) shown in FIGS. 5a and 5b, and the same reference numerals are used in FIGS. 23a and 23b for such modules. The encoder (2300) includes a block hash dictionary (2341), however, which stores hash values determined by applying hash functions to reconstructed sample values. For example, for BV estimation by the intra-picture estimator (540), the block hash dictionary (2341) stores hash values for candidate blocks in the current picture. For motion estimation by the motion estimator (550), a block hash dictionary (not shown) can store hash values for candidate blocks in one or more reference pictures. During hash-based block matching, the encoder determines the hash value for a current block using input sample values. The encoder compares it (or otherwise uses the hash value) against the hash values determined from reconstructed sample values for candidate blocks. The block hash dictionary (2341) is updated using reconstructed sample values.

Alternatively, the candidate blocks considered in hash-based block matching include input sample values. That is, the candidate blocks are part of an input version of a picture. Hash values for the candidate blocks are determined from the input sample values. During hash-based block matching, the encoder determines the hash value for a current block using input sample values. The encoder compares it (or otherwise uses the hash value) against the hash values determined from input sample values for candidate blocks. Even so, a matching block from reconstructed sample values is used to represent the current block. Thus, BC prediction operations still use reconstructed sample values.

Figure 24A:
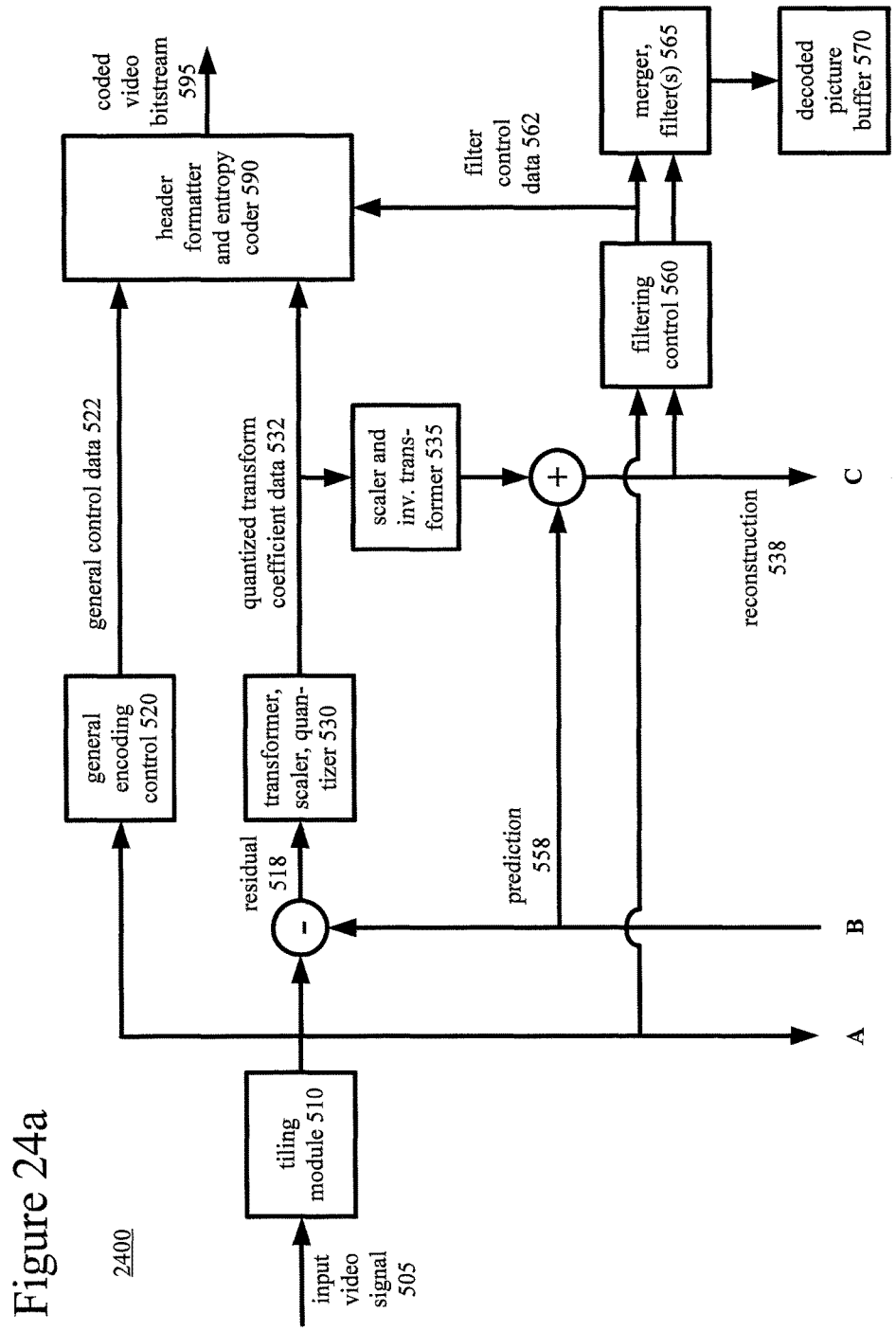
FIGS. 24a and 24b are diagrams illustrating a third example video encoder, in conjunction with which some described embodiments can be implemented.
Figure 24B:
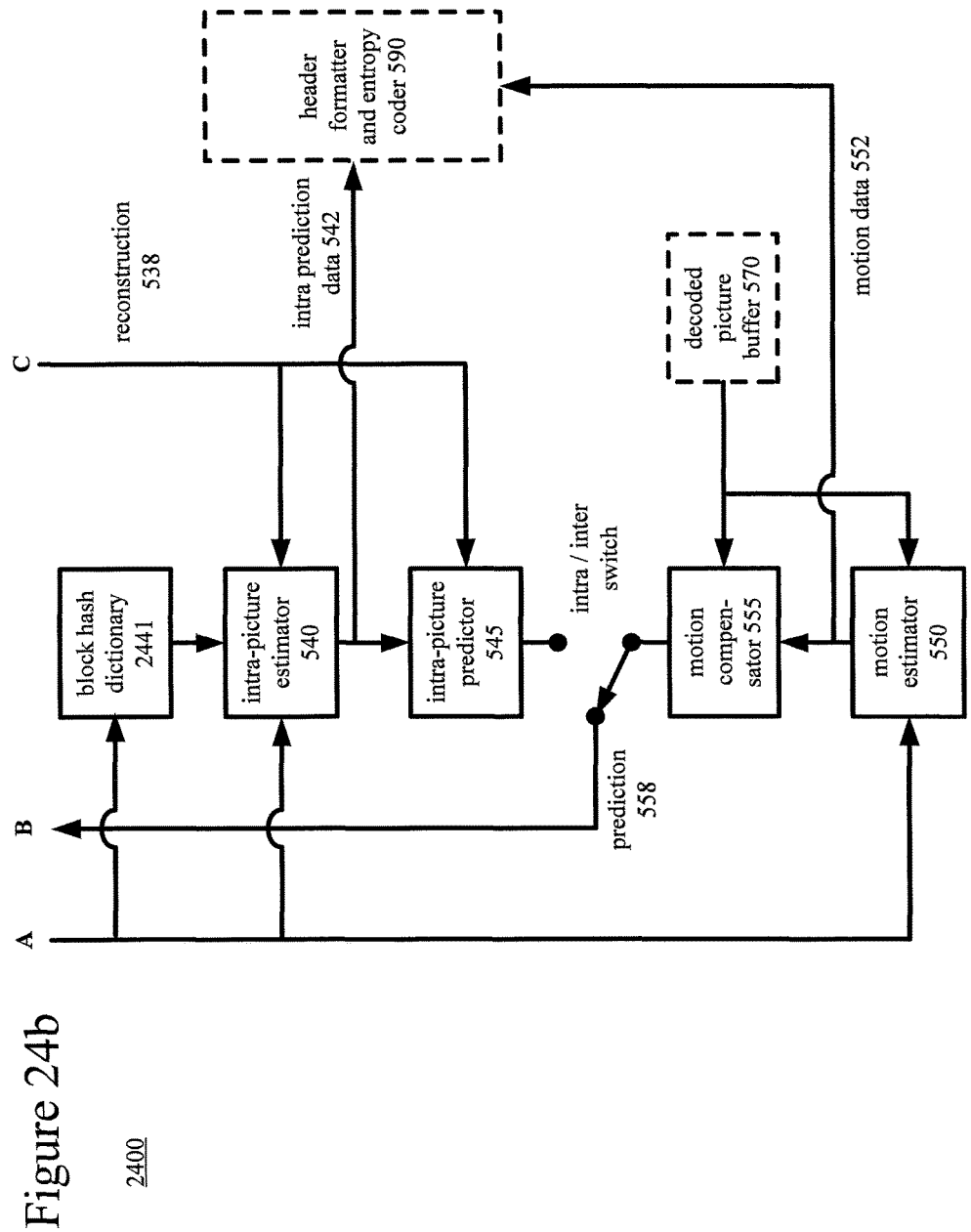

FIGS. 24a and 24b show a generalized video encoder (2400) that determines hash values from input sample values for use in hash-based block matching. In most respects, the modules of the encoder (2400) are identical to the modules of the encoder (500) shown in FIGS. 5a and 5b, and the same reference numerals are used in FIGS. 24a and 24b for such modules. The encoder (2400) includes a block hash dictionary (2441), however, which stores hash values determined by applying hash functions to input sample values from the input video signal (505). For example, for BV estimation by the intra-picture estimator (540), the block hash dictionary (2441) stores hash values for candidate blocks in the current picture. For motion estimation by the motion estimator (550), a block hash dictionary (not shown) can store hash values for candidate blocks in one or more reference pictures.

Using hash values determined from input sample values can improve intra BC prediction performance when some blocks are lossy coded. In this case, due to quantization noise, the encoder may be unable to find a matching block that exactly matches the current block if hash values are determined from reconstructed sample values. By determining hash values from input sample values, hash-based block matching is not affected by distortion introduced by lossy coding. The encoder still signals to a decoder which matching block to use for a current block (e.g., using a BV value).

G. Encoder Strategies for Block Flipping During Prediction.

In some example implementations, an encoder uses hash-based block matching when deciding whether to use block flipping. Hash-based block matching can provide a fast and efficient way to evaluate block flipping options during BV estimation or motion estimation.

FIG. 25 shows an example technique (2500) for deciding whether to use block flipping. An image encoder or video encoder such as one described with reference to FIG. 3, FIGS. 23a-23b or FIG. 24a-24b can perform the technique (2500).

The encoder performs (2510) hash-based block matching to determine a reference region for a current block (e.g., PU, CU) in a current picture. The reference region is selected from among multiple candidate blocks. For BV estimation, the current picture includes the candidate blocks. For motion estimation, a reference picture includes the candidate blocks. The hash-based block matching accounts for flipping of a prediction region for the current block relative to the reference region. The encoder can use any of several approaches to account for block flipping during the hash-based block matching.

In a first approach, the encoder flips the current block (horizontally and/or vertically) and determines a block hash value for the flipped current block. Then, the encoder searches a hash table to identify any of the candidate blocks having a block hash value that matches the block hash value for the flipped current block. The hash table organizes the candidate blocks according to their block hash values. The encoder can also search for the non-flipped current block in the hash table, determining a block hash value for the current block and searching the hash table to identify any of the candidate blocks having a block hash value that matches that of the current block.

For example, for the first approach, the encoder generates block hash values for candidate blocks in the valid region (region with reconstructed content). Depending on implementation, the candidate blocks can have a fixed size (e.g., 8×8) or different block sizes (e.g., 4×4, 8×8, 16×16 and 32×32, or a single row or column of sample values). The block hash values can be determined based on input sample values or reconstructed sample values, depending on implementation. If the block hash value for a flipped current block matches a block hash value for a candidate block in the hash table, the current block may match the flipped candidate block. The encoder can verify the match with other block hash values according to another hash function and/or with sample-wise block matching, and select the candidate block (reference region with or without block flipping) that provides the best performance.

In a second approach, in addition to organizing candidate blocks according to their block hash values, a hash table organizes at least some flipped versions of the candidate blocks according to block hash values of the flipped versions. A flipped version of a candidate block can be flipped horizontally and/or vertically. During hash-based block matching, the encoder determines a block hash value for the current block. Then, the encoder searches the hash table to identify any of the candidate blocks and flipped versions thereof having a block hash value that matches that of the current block.

For example, for the second approach, the encoder generates block hash values for candidate blocks in the valid region. Depending on implementation, the candidate blocks can have a fixed size or different block sizes, and the block hash values can be determined based on input sample values or reconstructed sample values. The encoder also generates block hash values for flipped versions of the candidate blocks (e.g., flipped vertically, flipped horizontally and/or flipped vertically and horizontally). With this approach, the block hash value for the current block can match the block hash value for one or more non-flipped candidate blocks and/or one or more flipped candidate blocks. The encoder can verify the match with other block hash values according to another hash function and/or with sample-wise block matching, and select the candidate block (reference region with or without block flipping) that provides the best performance. Compared to the first approach, the second approach uses a larger hash table that includes block hash values for flipped versions of the candidate blocks, but may involve fewer lookup operations.

Returning to FIG. 25, the encoder determines (2520) the prediction region for the current block based on the reference region. The prediction region can be flipped relative to the reference region (e.g., flipped vertically, flipped horizontally, or flipped vertically and horizontally).

The encoder encodes (2530) the current block using the prediction region and outputs (2540) encoded data in a bitstream. For motion estimation, the encoded data includes an MV value for the current block that indicates a displacement to the reference region. For BV estimation, the encoded data can include a BV value for the current block that indicates a displacement to the reference region. Or, the encoded data can include a hash value for the current block that indicates the reference region in a block hash dictionary, where the hash value is separate from any indication whether the prediction region is flipped relative to the reference region. Or, the encoded data includes a hash value for the current block that indicates the intra BC prediction region in a block hash dictionary, where the hash value provides an indication whether the prediction region is flipped relative to the reference region.

The encoder can similarly encode other predicted blocks on a block-by-block basis for a slice, tile or picture, with or without block flipping.

H. Encoder Strategies for Intra-BC-Prediction Skip Mode.

In some example implementations, an encoder uses hash-based block matching when deciding whether to encode a block using intra BC prediction in skip mode. Hash-based block matching provides a fast and efficient way to evaluate options for encoding mode.

FIG. 26 shows an example technique (2600) for deciding whether a block should be encoded in intra-BC-predicted skip mode. An image encoder or video encoder such as one described with reference to FIG. 3, FIGS. 23a-23b or FIG. 24a-24b can perform the technique (2600).

At a high level, the encoder decides whether a current block (e.g., CU, PU) in a current picture is to be encoded using intra BC prediction in skip mode. The encoder gets (2610) the next block in the current picture and performs (2620) hash-based block matching to determine a reference region in the current picture.

The encoder can also compare (2630) a quantization parameter ("QP") value for the block to a QP value for the reference region. If the reference region covers parts of blocks that have different QP values, the QP value for the reference region can be (a) a smallest QP value among the different QP values for the blocks, (b) a QP value of whichever block covers a largest portion of the reference region, (c) an average QP value among the different QP values for the blocks, (d) a weighted average QP value among the different QP values for the blocks, (e) a largest QP value among the different QP values for the blocks, or (f) some other QP value derived from one or more of the different QP values for the blocks. Alternatively, instead of comparing QP values for the block and reference region, the encoder calculates residual values for the block relative to reference region.

The encoder determines (2640) whether the block is to be encoded using intra BC prediction in skip mode. For example, the encoder checks that, as a condition of the block being encoded using intra BC prediction in skip mode, input sample values of the reference region identically match corresponding input sample values of the block. Alternatively, the encoder checks that, as a condition of the block being encoded using intra BC prediction in skip mode, sample values of the reference region are sufficiently close to corresponding sample values of the block (e.g., in terms of a distortion metric such as sum of absolute differences or mean squared error). Or, as another example, the encoder can check that, as a condition of the block being encoded using intra BC prediction in skip mode, the QP value for the block is greater than or equal to the QP value for the reference region. (If the QP value for the block is greater than or equal to the QP value for the reference region, the expected error for the block is equivalent to or worse than the expected error for the reference region.) Alternatively, instead of checking QP values for the block and reference region, the encoder evaluates residual values for the block relative to reference region (e.g., checking energy in the residual values, counting non-zero frequency coefficients for the residual values after a frequency transform). Or, the encoder can check other and/or additional conditions.

If the block is to be encoded using intra BC prediction in skip mode, the encoder encodes (2660) the block using intra BC prediction with a BV value. The BV value for the block indicates a displacement to the reference region. The encoder can also determine a BV differential for the block using the BV value for the block and a BV predictor for the block, and encode the BV differential. The encoder outputs in a bitstream encoded data for the block. Since the block is an intra-BC predicted block in skip mode, the bitstream lacks residual data for the block.

Otherwise (block is not to be encoded using intra BC prediction in skip mode), the encoder encodes (2650) the block in another mode (e.g., inter-prediction, intra spatial prediction, non-skip intra BC prediction).

The encoder determines (2670) whether to continue with the next block in the picture. If so, the encoder gets (2610) the next block and continues encoding.

The encoder can repeat the technique (2600) on a picture-by-picture basis, tile-by-tile basis, slice-by-slice basis or some other basis. An intra-BC-predicted block in skip mode can be predicted using block flipping, in which case the intra BC prediction region for the block is flipped (vertically and/or horizontally) relative to the reference region.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device with a video encoder or an image encoder, a method comprising:
    deciding whether a current block in a current picture is to be encoded using an intra block copy ("BC") prediction in a skip mode, including:
        performing a hash-based block matching for the current block;
        determining that the hash-based block matching fails for the current block;
        determining a reference region in the current picture, including selecting a predicted block vector ("BV") value for the current block from among multiple available BV values in a neighborhood around the current block, wherein the predicted BV value indicates a displacement to the reference region in the current picture; and
        determining that input sample values of the reference region identically match corresponding input sample values of the current block, a quantization parameter ("QP") value for the current block being greater than or equal to a QP value for the reference region; and
        encoding the current block using the intra BC prediction in the skip mode, the skip mode using the predicted BV value for the current block; and
    outputting in a bitstream encoded data, wherein the bitstream lacks a BV differential value for the current block and lacks residual data for the current block.

2. The method of claim 1 wherein the reference region covers at least part of each of multiple blocks in the current picture, at least some of the multiple blocks having different QP values, and wherein the QP value for the reference region is one of:
    a smallest QP value among the different QP values for the multiple blocks;
    a QP value of whichever block among the multiple blocks covers a largest portion of the reference region;
    an average QP value among the different QP values for the multiple blocks; and
    a weighted average QP value among the different QP values for the multiple blocks.

3. The method of claim 1 wherein the intra BC prediction includes:
    determining an intra BC prediction region for the current block using the reference region, wherein the intra BC prediction region is flipped relative to the reference region.

4. The method of claim 3 wherein the intra BC prediction region is flipped horizontally relative to the reference region and/or flipped vertically relative to the reference region.

5. The method of claim 1 wherein the current block is part of a coding unit.

6. One or more computer-readable memory or storage devices storing computer-executable instructions for causing a computing device, when programmed thereby, to perform operations comprising:
    deciding whether a current block in a current picture is to be encoded using an intra block copy ("BC") prediction in a skip mode, including:
        performing a hash-based block matching for the current block;
        determining that the hash-based block matching fails for the current block;
        determining a reference region in the current picture, including selecting a predicted block vector ("BV") value for the current block from among multiple available BV values in a neighborhood around the current block, wherein the predicted BV value indicates a displacement to the reference region in the current picture; and
        determining that input sample values of the reference region identically match corresponding input sample values of the current block, a quantization parameter ("QP") value for the current block being greater than or equal to a QP value for the reference region; and
    encoding the current block using the intra BC prediction in the skip mode, the skip mode using the predicted BV value for the current block; and
    outputting in a bitstream encoded data, wherein the bitstream lacks a BV differential value for the current block and lacks residual data for the current block.

7. The one or more computer-readable memory or storage devices of claim 6 wherein the reference region covers at least part of each of multiple blocks in the current picture, at least some of the multiple blocks having different QP values, and wherein the QP value for the reference region is one of: a smallest QP value among the different QP values for the multiple blocks; a QP value of whichever block among the multiple blocks covers a largest portion of the reference region;
    an average QP value among the different QP values for the multiple blocks; and
    a weighted average QP value among the different QP values for the multiple blocks.

8. The one or more computer-readable memory or storage devices of claim 6 wherein the current block is part of a coding unit.

9. A computing device comprising:
    one or more buffers configured to store a current picture; and
    a video encoder or an image encoder configured to perform operations comprising:
        deciding whether a current block in the current picture is to be encoded using an intra block copy ("BC") prediction in a skip mode, including:
            performing a hash-based block matching for the current block;
            determining that the hash-based block matching fails for the current block;
            determining a reference region in the current picture, including selecting a predicted block vector ("BV") value for the current block from among multiple available BV values in a neighborhood around the current block, wherein the predicted BV value indicates a displacement to the reference region in the current picture; and determining that input sample values of the reference region identically match corresponding input sample values of the current block, a quantization parameter ("QP") value for the current block being greater than or equal to a QP value for the reference region; and encoding the current block using the intra BC prediction in the skip mode, the skip mode using the predicted BV value for the current block; and outputting in a bitstream encoded data, wherein the bitstream lacks a BV differential value for the current block and lacks residual data for the current block.

10. The computing device of claim 9 wherein the reference region covers at least part of each of multiple blocks in the current picture, at least some of the multiple blocks having different QP values, and wherein the QP value for the reference region is one of:

a smallest QP value among the different QP values for the multiple blocks;

a QP value of whichever block among the multiple blocks covers a largest portion of the reference region;

an average QP value among the different QP values for the multiple blocks; and a weighted average QP value among the different QP values for the multiple blocks.

11. The computing device of claim 9 wherein the current block is part of a coding unit.

12. The computing device of claim 9 wherein the intra BC prediction includes:

determining an intra BC prediction region for the current block using the reference region, wherein the intra BC prediction region is flipped relative to the reference region.

13. The computing device of claim 12 wherein the intra BC prediction region is flipped horizontally relative to the reference region and/or flipped vertically relative to the reference region.

14. The one or more computer-readable memory or storage devices of claim 6 wherein the intra BC prediction includes:

determining an intra BC prediction region for the current block using the reference region, wherein the intra BC prediction region is flipped relative to the reference region.

15. The one or more computer-readable memory or storage devices of claim 14 wherein the intra BC prediction region is flipped horizontally relative to the reference region and/or flipped vertically relative to the reference region.

* * * * *